(12) United States Patent
Wang et al.

(10) Patent No.: US 8,091,416 B2
(45) Date of Patent: Jan. 10, 2012

(54) ROBUST DESIGN OF DIAGNOSTIC ENABLING CONDITIONS FOR SCR NOX CONVERSION EFFICIENCY MONITOR

(75) Inventors: Yue-Yun Wang, Troy, MI (US); Ognyan N. Yanakiev, Canton, MI (US); Charles E. Solbrig, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 563 days.

(21) Appl. No.: 12/355,094

(22) Filed: Jan. 16, 2009

(65) Prior Publication Data

US 2010/0180576 A1 Jul. 22, 2010

(51) Int. Cl.
 *G01M 15/10* (2006.01)
(52) U.S. Cl. .................................................. 73/114.75
(58) Field of Classification Search ............... 73/114.69, 73/114.75; 60/273, 281, 274, 277
See application file for complete search history.

(56) References Cited

U.S. PATENT DOCUMENTS

| | | | |
|---|---|---|---|
| 7,219,008 B2 * | 5/2007 | Barrillon et al. ............... 701/114 |
| 2002/0120386 A1 * | 8/2002 | Shi et al. ........................ 701/114 |
| 2003/0051463 A1 * | 3/2003 | Kobayashi et al. ............. 60/274 |
| 2004/0040282 A1 * | 3/2004 | Zhu ................................. 60/276 |
| 2004/0159094 A1 * | 8/2004 | Yurgil et al. .................... 60/277 |
| 2006/0241850 A1 * | 10/2006 | Barrillon et al. ............... 701/109 |
| 2009/0049899 A1 * | 2/2009 | Hjorsberg et al. ......... 73/114.75 |
| 2009/0165440 A1 * | 7/2009 | Sawada et al. .................. 60/276 |
| 2009/0288391 A1 * | 11/2009 | Aoki ............................... 60/273 |
| 2009/0320454 A1 * | 12/2009 | Sawada et al. .................. 60/285 |
| 2010/0043397 A1 | 2/2010 | Wang et al. |
| 2010/0043400 A1 | 2/2010 | Wang et al. |
| 2010/0050758 A1 * | 3/2010 | Wang et al. ................ 73/114.75 |
| 2010/0257922 A1 * | 10/2010 | Shibata et al. ............. 73/114.75 |

* cited by examiner

*Primary Examiner* — Eric S McCall

(57) ABSTRACT

A method for controlling a malfunction catalyst diagnostic test that determines a malfunction status of a catalyst within a selective catalytic reduction device includes monitoring an exhaust gas flow within an aftertreatment system, estimating an effect of the exhaust gas flow on an estimated reductant storage on a catalyst within the selective catalytic reduction device, and selectively disabling the malfunction catalyst diagnostic test based upon the estimating the effect of the exhaust gas flow on the estimated reductant storage.

37 Claims, 9 Drawing Sheets

ROBUST DESIGN OF DIAGNOSTIC ENABLING CONDITIONS FOR SCR NOX CONVERSION EFFICIENCY MONITOR

TECHNICAL FIELD

This disclosure is related to control of aftertreatment of NOx emissions in internal combustion engines.

BACKGROUND

The statements in this section merely provide background information related to the present disclosure and may not constitute prior art.

Emissions control is a factor in engine design and engine control. NOx, a known by-product of combustion, is created by nitrogen and oxygen molecules present in engine intake air disassociating in the high temperatures of combustion. Rates of NOx creation follow known relationships to the combustion process, for example, with higher rates of NOx creation being associated with higher combustion temperatures and longer exposure of air molecules to the higher temperatures. Reduction of NOx created in the combustion process and management of NOx in an exhaust aftertreatment system are desirable in vehicle design.

NOx molecules, once created in the combustion chamber, can be converted back into nitrogen and oxygen molecules in exemplary devices known in the art within the broader category of aftertreatment devices. However, one having ordinary skill in the art will appreciate that aftertreatment devices are largely dependent upon operating conditions, such as device operating temperature driven by exhaust gas flow temperatures. Additionally, aftertreatment devices include materials, such as catalyst beds, prone to damage or degradation as a result of use over time and exposure to high temperatures.

Modern engine control methods utilize diverse operating strategies to optimize combustion. Some operating strategies, optimizing combustion in terms of fuel efficiency, include lean, localized, or stratified combustion within the combustion chamber in order to reduce the fuel charge necessary to achieve the work output required of the cylinder. While temperatures in the combustion chamber can get high enough in pockets of combustion to create significant quantities of NOx, the overall energy output of the combustion chamber, in particular, the heat energy expelled from the engine through the exhaust gas flow, can be greatly reduced from normal values. Such conditions can be challenging to exhaust aftertreatment strategies, since, as aforementioned, aftertreatment devices frequently require an elevated operating temperature, driven by the exhaust gas flow temperature, to operate adequately to treat NOx emissions.

Aftertreatment devices are known, for instance, utilizing chemical reactions to treat constituents in the exhaust gas flow. One exemplary device includes a selective catalytic reduction device ('SCR'). An SCR utilizes a reductant capable of reacting with NOx to treat the NOx. One exemplary reductant is ammonia derived from urea injection or recovered through catalytic reaction of components of the exhaust gas flow. This disclosure will discuss ammonia generically as a reductant, however, it will be appreciated that a number of reductants are known in the art and are contemplated in this disclosure. Ammonia stored on a catalyst bed within the SCR reacts with NOx, preferably $NO_2$, and produces favorable reactions to treat the NOx. It is known to operate a diesel oxidation catalyst ('DOC') upstream of the SCR in diesel applications to convert NO into $NO_2$ preferable to treatment in the SCR. Continued improvement in exhaust aftertreatment requires accurate information regarding NOx emissions in the exhaust gas flow in order to achieve effective NOx reduction, such as dosing proper amount of urea based on monitored NOx emissions.

Other aftertreatment devices are additionally known for treating constituents in the exhaust gas flow. Three way catalysts ('TWC') are utilized particularly in gasoline application to treat constituents. Lean NOx traps ('NOx trap') utilize catalysts capable of storing some amount of NOx, and engine control technologies have been developed to combine these NOx traps or NOx adsorbers with fuel efficient engine control strategies to improve fuel efficiency and still achieve acceptable levels of NOx emissions. One exemplary strategy includes using a lean NOx trap to store NOx emissions during fuel lean operations and then purging the stored NOx during fuel rich, higher temperature engine operating conditions with conventional three-way catalysis to nitrogen and water. Diesel particulate filters ('DPF') trap soot and particulate matter in diesel applications, and the trapped material is periodically purged in high temperature regeneration events.

Aftertreatment devices such as SCR devices convert NOx to other molecules at some conversion efficiency. NOx conversion efficiency can be described by the flow of NOx flowing into a device versus the flow of NOx exiting the device. Reduced conversion efficiency within an SCR device can result from a number of conditions. Malfunctions or degraded performance caused by wear or damage can reduce the efficiency of the aftertreatment device. Additionally, an SCR device otherwise operating properly can experience reduced efficiency according to properties of the exhaust gas flow that affect the chemical reaction occurring in the device. For example, temperature and space velocity of the gases within a NOx trap affect the efficiency of the device. Temperature and space velocity of the gases within an SCR device similarly affect the efficiency of the device. These environmental factors can be monitored in the aftertreatment system, and effects of these factors upon device conversion efficiency can be estimated. Additionally, failure of the system to replenish ammonia within the SCR device results in reduced efficiency, and elevated levels of ammonia slip or dissipation result in variability in efficiency. Tests to evaluate malfunction catalysts are known, for example by evaluating a current conversion efficiency versus an expected conversion efficiency. However, false indications of a malfunction catalyst are possible depending upon whether reduced conversion efficiency is a result of a malfunctioning device or conditions within the device. A method to distinguish degraded performance based upon transient environmental conditions from a malfunctioning or damaged aftertreatment device, for example, in the form of conditions required to initiate a test for a malfunction catalyst, would be beneficial to diagnosing a malfunction condition in the device.

SUMMARY

A powertrain includes an internal combustion engine and an aftertreatment system including a selective catalytic reduction device. A method for controlling a malfunction catalyst diagnostic test that determines a malfunction status of a catalyst within the selective catalytic reduction device includes monitoring an exhaust gas flow within the aftertreatment system, estimating an effect of the exhaust gas flow on an estimated reductant storage on a catalyst within the selective catalytic reduction device, and selectively disabling the malfunction catalyst diagnostic test based upon the estimating the effect of the exhaust gas flow on the estimated reductant storage.

BRIEF DESCRIPTION OF THE DRAWINGS

One or more embodiments will now be described, by way of example, with reference to the accompanying drawings, in which.

DETAILED DESCRIPTION

Figure 1:
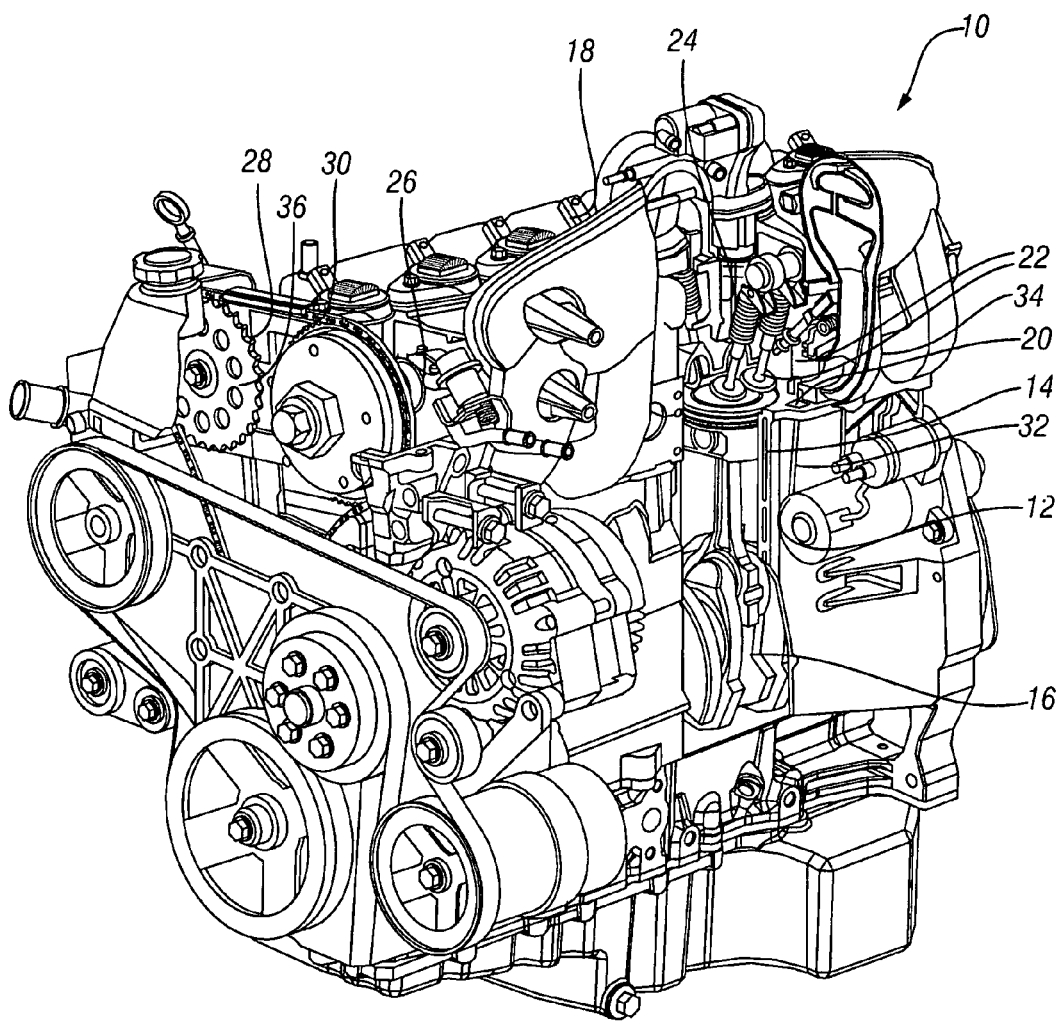
FIG. 1. is a sectional representation of an exemplary diesel engine, in accordance with the present disclosure.

Referring now to the drawings, wherein the showings are for the purpose of illustrating certain exemplary embodiments only and not for the purpose of limiting the same, FIG. 1 is a sectional representation of an exemplary diesel engine, in accordance with the present disclosure. Engine 10 conventionally includes a plurality of cylinders 12 having therein reciprocable pistons 14 connected with a crankshaft 16. This disclosure is generally applicable to direct injection four-stroke compression ignition engines. The ends of the cylinder are closed by a cylinder head 18 so that the cylinders and pistons define variable volume combustion chambers 20.

The cylinder head is provided with intake valves 22 which control the timing and flow of intake air into the cylinders during intake strokes of the pistons. Exhaust valves 24 in the cylinder head control timing and flow of exhaust products from the combustion chambers during exhaust strokes of the pistons. In the engine shown there are two intake valves and two exhaust valves for each cylinder, however, any suitable number of valves provided for operation of the engine may be utilized in accordance with the disclosure.

The intake and the exhaust valves are actuated by separate valve actuation devices 26, 28. The valve actuation devices exclusively operate their respective intake and exhaust valves, however, both are driven by the crankshaft 16 through a timing chain 30.

The exemplary engine 10 includes a cast-metal engine block with a plurality of cylinders formed therein and an engine head. The engine block preferably includes coolant passages 32 through which engine coolant fluid passes. A coolant temperature sensor, operable to monitor temperature of the coolant fluid, is located at an appropriate location, and provides a parametric signal input to a control system indicative of engine operating temperature useful in engine control. The engine preferably includes known systems including an external exhaust gas recirculation ('EGR') valve and an intake air throttle valve (not shown).

Each piston 14 is connected via a pin and connecting rod to the crankshaft 16. The crankshaft 16 is rotatably attached to the engine block at a main bearing area near a bottom portion of the engine block, such that the crankshaft is able to rotate around an axis that is perpendicular to a longitudinal axis defined by each cylinder. A crank sensor (not shown) is placed in an appropriate location, operable to generate a signal that is useable by the controller to measure crank angle, and which is translatable to provide measures of crankshaft rotation, speed, and acceleration that are useable in various control schemes. During operation of the engine, each piston 14 moves up and down in the cylinder in a reciprocating fashion due to connection to and rotation of the crankshaft 16, and the combustion process. The rotation action of the crankshaft effects translation of linear force exerted on each piston during combustion to an angular torque output from the crankshaft, which can be transmitted to another device, e.g. a vehicle driveline.

The engine head comprises a cast-metal device having one or more intake ports and one or more exhaust ports which flow to the combustion chamber 20. The intake port supplies air to the combustion chamber 20. Combusted (burned) gases flow from the combustion chamber 20 via the exhaust port. Flow of air through each intake port is controlled by actuation of one or more intake valves 22. Flow of combusted gases through each exhaust port is controlled by actuation of one or more exhaust valves 24.

The intake and exhaust valves 22, 24 each have a head portion that includes a top portion that is exposed to the combustion chamber. Each of the valves 22, 24 has a stem that is connected to a valve actuation device. A valve actuation device 26 is operative to control opening and closing of each of the intake valves 22, and a second valve actuation device 28 operative to control opening and closing of each of the exhaust valves 24. Each of the valve actuation devices 26,28 comprises a device signally connected to the control system and operative to control timing, duration, and magnitude of opening and closing of each valve, either in concert or individually. One embodiment of the exemplary engine comprises a dual overhead cam system which has variable lift control ('VLC') and variable cam phasing ('VCP') devices as part of the valve actuation devices 26, 28. VCP devices are operative to control timing of opening or closing of each intake valve and each exhaust valve relative to rotational position of the crankshaft and opens each valve for a fixed crank angle duration. VLC devices are operative to control magnitude of valve lift to one of two positions which, on an exemplary configuration, includes one position to 3-5 mm lift for an open duration of 120-150 crank angle degrees, and another position to 9-12 mm lift for an open duration of 220-260 crank angle degrees. Individual valve actuation devices can serve the same function to the same effect. The valve actuation devices are preferably controlled by the control system 25 according to predetermined control schemes. Alternative variable valve actuation devices including, for example, fully flexible electrical or electro-hydraulic devices may also be used and have the further benefit of independent opening and closing phase control as well as substantially infinite valve lift variability within the limits of the system. A specific aspect of a control scheme to control opening and closing of the valves is described herein.

Air is inlet to the intake port through an intake manifold runner 34, which receives filtered air passing through a known air metering device and a throttle device (not shown). Exhaust gas passes from the exhaust port to an exhaust manifold, which includes exhaust gas sensors operative to monitor constituents of the exhaust gas flow, and determine parameters associated therewith. The exhaust gas sensors can comprise any of several known sensing devices operative to provide parametric values for the exhaust gas flow, including air/fuel ratio, or measurement of exhaust gas constituents, e.g. NOx, CO, HC, and others. The system may include an in-cylinder sensor for monitoring combustion pressures, or non-intrusive pressure sensors or inferentially determined pressure determination (e.g. through crankshaft accelerations). The aforementioned sensors and metering devices each provide a signal as a parametric input to the control system. These parametric inputs can be used by the control system to determine combustion performance measurements.

The control system preferably comprises a subset of an overall control architecture operable to provide coordinated system control of the engine 10 and other systems. In overall operation, the control system is operable to synthesize operator inputs, ambient conditions, engine operating parameters, and combustion performance measurements, and execute algorithms to control various actuators to achieve targets for control parameters, including such parameters as fuel economy, emissions, performance, and drivability. The control system is operably connected to a plurality of devices through which an operator controls or directs operation of the engine. Exemplary operator inputs include an accelerator pedal, a brake pedal, transmission gear selector, and vehicle speed cruise control when the engine is employed in a vehicle. The control system may communicate with other controllers, sensors, and actuators via a local area network ('LAN') bus (not shown) which preferably allows for structured communication of control parameters and commands between various controllers.

The control system is operably connected to the engine 10, and functions to acquire parametric data from sensors, and control a variety of actuators of the engine 10 over appropriate interfaces. The control system receives an engine torque command, and generates a desired torque output, based upon the operator inputs. Exemplary engine operating parameters that are sensed by control system using the aforementioned sensors include engine coolant temperature, crankshaft rotational speed ('RPM') and position, manifold absolute pressure, ambient air flow and temperature, and ambient air pressure. A sensor capable of monitoring crankshaft rotational position can be utilized to monitor or determine a progression of the engine and various cylinders through various stages of a combustion cycle. Combustion performance measurements may comprise measured and inferred combustion parameters, including air/fuel ratio, and location of peak combustion pressure, among others.

Actuators controlled by the control system include: fuel injectors (not shown); the VCP/VLC valve actuation devices 26, 28; EGR valve (not shown), and, electronic throttle control module (not shown). Fuel injectors are preferably operable to inject fuel directly into each combustion chamber 20.

The control system preferably comprises one or more controllers comprising general-purpose digital computers generally including a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer.

Algorithms for engine control may be executed during preset loop. Algorithms stored in the non-volatile memory devices are executed by the central processing unit and are operable to monitor inputs from the sensing devices and execute control and diagnostic routines to control operation of the engine, using preset calibrations. Loop cycles may be executed at regular intervals, for example each 3.125, 6.25, 12.5, 25 and 100 milliseconds during ongoing engine operation. Alternatively, algorithms may be executed in response to occurrence of an event or interrupt request.

FIG. 1 describes an exemplary diesel engine. However, it will be appreciated that NOx treatment and aftertreatment systems are utilized in other engine configurations including gasoline engines, and the disclosure is not intended to be limited to the specific exemplary engine embodiment described herein.

Figure 2:
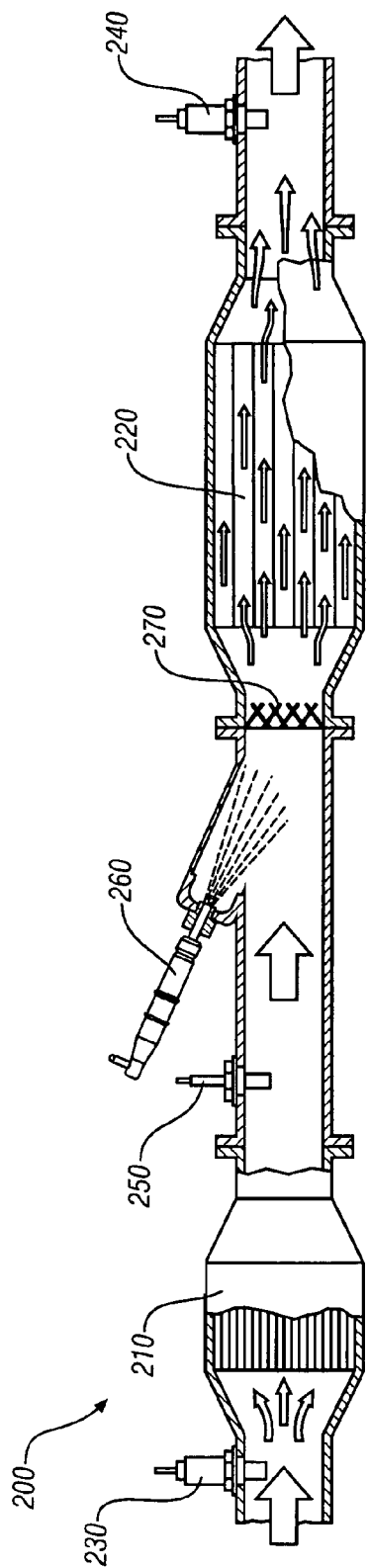
FIG. 2 schematically illustrates an exemplary aftertreatment system, in accordance with the present disclosure.

FIG. 2 schematically illustrates an exemplary aftertreatment system, in accordance with the present disclosure. Aftertreatment system 200 comprises DOC 210, SCR 220, upstream NOx sensor 230, downstream NOx sensor 240, temperature sensor 250, and urea dosing module 260. As is known in the art, DOC 210 performs a number of catalytic functions necessary to aftertreatment of an exhaust gas flow. One of the functions of DOC 210 is to convert NO, a NOx constituent not easily treated in an SCR, into NO2, a NOx constituent easily treated in an SCR. SCR 220 utilizes urea as a reactant to reduce NOx into other molecules. Upstream NOx sensor 230 detects and quantifies NOx in the exhaust gas flow entering aftertreatment system 200. While upstream NOx sensor 230 is illustrated as an exemplary means to quantify NOx entering the aftertreatment system, it should be noted that NOx entering the system can be quantified for use in evaluating conversion efficiency in an SCR by other means, for example, through a NOx sensor located between DOC 210 and SCR 220 or through a virtual NOx sensor modeling engine output and conditions within the exhaust gas flow to estimate the presence of NOx entering the aftertreatment system. This disclosure in general discusses a sensor input describing NOx entering the aftertreatment system in accordance with the exemplary embodiment, however it will be appreciated that, depending upon upstream sensor placement, the input could actually describe NOx content entering a portion of the aftertreatment system. SCR 220 utilizes ammonia, for example, as derived from injected urea, to convert NOx to other molecules by methods known in the art. Temperature sensor 250 is depicted, located in a region to gather exhaust gas flow temperatures within the aftertreatment system 200. Urea dosing module 260 is depicted in a position upstream of SCR 220. The urea can be directly sprayed into the exhaust gas flow entering the SCR. However, a preferred method is depicted, utilizing a mixer device 270. Urea dosing module 260 injects urea onto mixer device 270, and the urea is then carried by the exhaust gas flow in a substantially even distribution onto the catalyst surfaces on the interior of SCR 220. Downstream NOx sensor 240 detects and quantifies NOx in the exhaust gas flow exiting aftertreatment system 200. It should be noted that NOx sensors can be cross sensitive to ammonia. Methods are known to distinguish sensor readings between NOx, ammonia, and a mix of the two in order to correctly diagnose operation of the SCR device. A method is disclosed to utilize a measure of the NOx entering the aftertreatment system and a measure of the NOx exiting the aftertreatment system to determine the conversion efficiency of the NOx into other molecules within aftertreatment devices.

Conversion efficiency is described as the efficiency with which an aftertreatment device can convert NOx into other molecules. The exemplary aftertreatment system described above describes a measured or estimated NOx content of the exhaust gas flow measured upstream of the aftertreatment device being analyzed. This measure of NOx entering the aftertreatment system can be described at any time t as x(t). The exemplary aftertreatment system described above describes a measured or estimated NOx content of the exhaust gas flow measured downstream of the aftertreatment device being analyzed. This measure of NOx exiting the aftertreatment system can be described at any time as y(t). Conversion efficiency at any given time by the following equation.

$$\eta_{ACTUAL}(t) = 1 - \frac{y(t)}{x(t)} \quad [1]$$

It will be appreciated that this equation provides the conversion efficiency at any instant in time. Such instantaneous measurements or calculations are prone to error based upon signal noise. Methods to apply a low pass filter are known in the art. An integration of x(t) or y(t) yields a description of a quantity of actual NOx to enter or exit the aftertreatment system through a time period, respectively. An exemplary equation to determine an integrated conversion efficiency, filtering anomalous measurements in x(t) and y(t), can be described as follows.

$$\eta_{ACTUAL} = 1 - \frac{\int y(t)*dt}{\int x(t)*dt} \quad [2]$$

In this way, measured or estimated values of NOx entering and exiting the aftertreatment system can be utilized to determine an estimated or calculated actual conversion efficiency of the aftertreatment system.

A properly operating or fresh aftertreatment device operates with some maximum achievable conversion efficiency for a given set of conditions. However, it will be appreciated that aftertreatment devices, particularly devices utilizing a catalyst, are subject to degraded performance over time and in particular with exposure to high temperatures. Identifying a malfunction catalyst is desirable in maintaining low NOx emissions and continued enablement of fuel efficient engine operating modes.

Conversion efficiency in a fresh device is affected by a number of environmental or operational factors. Conversion efficiency for an exemplary SCR can be determined by a model expressed by the following function.

$$\eta = f(T_{BED}, SV, \theta_{NH_3}, x(t), V_{UREA}, \rho_{CELL}) \quad [3]$$

$T_{BED}$ describes the temperature of the catalyst bed within the SCR. This temperature can be directly measured or can be estimated based upon temperature, flow rate, and other properties of the exhaust gas flow. SV describes the space velocity of exhaust gas flowing through the SCR device and can be determined as a function of properties of the exhaust gas flow, including temperature and flow rate. SV can be expressed as the standard volume flow normalized by the catalyst volume. $\theta_{NH_3}$ describes an amount of ammonia storage on the catalyst bed, and adequate presence of ammonia on the SCR is required to achieve the desired NOx conversion reaction. $\theta_{NH_3}$ can be estimated, for example, by analyzing ammonia adsorbtion and desorbtion rates, NOx conversion rates, and adsorbed ammonia oxidation rates. As described above, x(t) describes the presence of NOx in the exhaust gas flow entering the aftertreatment system. Low levels of NOx are easily reacted within a properly functioning SCR, while levels of NOx above a certain threshold are more difficult to react and correspond to lower conversion efficiencies. An example of a factor limiting treatment of NOx above certain quantities includes limited ammonia present in an SCR. $V_{UREA}$ describes the volume of urea injected. While $V_{UREA}$ describes a presence of ammonia similarly to $\theta_{NH_3}$, $V_{UREA}$ includes a present measure of urea being injected and can better describe transient indicator for ammonia expected to be present in the near future. $\rho_{CELL}$ describes the density of catalyst material within the SCR and, therefore, describes a capacity of the SCR to catalyze the intended reaction.

The above model describing conversion efficiency includes factors which can be assumed or confirmed in normal operation of an SCR. As a result, the model can be simplified, thereby reducing a processing load required to analyze conversion efficiency through the model. For example, $V_{UREA}$ can be monitored through operation of the urea dosing module, and given $V_{UREA}$ values in a particular intended range, the resulting conversion efficiency calculations should remain unaffected. In some embodiments, $V_{UREA}$ is controlled to be substantially directly proportional to x(t). Additionally, $\theta_{NH_3}$ can in some embodiments be estimated based upon $V_{UREA}$, monitored characteristics of the exhaust gas flow and of the SCR, such as temperature, and x(t). Given $\theta_{NH_3}$ values in a normal range, $\theta_{NH_3}$ can be reduced to a portion of the functional model dependent upon $T_{BED}$. A value for x(t), as described above, can be monitored through an upstream NOx sensor or a virtual NOx sensor. $\rho_{CELL}$ is a characteristic of the SCR device and is a known value. As a result of these known or estimable factors, conversion efficiency for an exemplary SCR can be determined by a simplified model expressed by the following function.

$$\eta = f(T_{BED}, SV, \theta_{NH_3}) \quad [4]$$

In this way, conversion efficiency of the SCR can be accurately determined as an on board diagnostic function by maintaining other factors within known or calibrated ranges.

As described above, a reduction in conversion efficiency can indicate a malfunction catalyst or a damaged catalyst with reduced capability to treat constituents in the exhaust gas flow. Indicating a malfunction catalyst is desirable to prompt repair of the device and avoid prolonged operation of the powertrain with increased emissions. Quickly identifying a malfunction catalyst is desirable in reducing a time period wherein a damaged catalyst results in increased emissions. However, avoiding false indications of a malfunction catalyst is desirable in customer satisfaction and avoiding unnecessary repairs of expensive components. A number of methods to accurately diagnose a malfunction catalyst are contemplated. One exemplary method, based upon the above models or other models known in the art for a particular aftertreatment device, includes comparing an estimated conversion efficiency for a fresh aftertreatment device to a measured conversion efficiency. A malfunction conversion efficiency for a device under given operating conditions can be calibrated based upon test data or can be set as a fraction of an estimated conversion efficiency of a fresh device. A degree of degraded conversion efficiency indicating that the aftertreatment device is not operating properly may be developed experimentally, empirically, predictively, through modeling or other techniques adequate to accurately predict aftertreatment device operation, and a multitude of malfunction conversion efficiencies might be used by the same aftertreatment device for different conditions or operating ranges. Subject to the assumptions described above, a malfunction conversion efficiency ($\eta_{malf\_predicted}$) for an SCR, a threshold conversion efficiency for given operating conditions which a device should operate to and not be considered malfunctioning, can be expressed by the following function.

$$\eta_{malf\_predicted} = f(T_{BED}, SV, \theta_{NH_3}) \quad [5]$$

In this case, the malfunction conversion efficiency can be expressed as a function of the temperature within the device, the speed of the exhaust gases flowing through the device, and the amount of ammonia storage. Such a function can be defined or mapped by test data or calibrated values known to indicate a malfunction catalyst for given input conditions. Alternatively, given a known acceptable or nominal conversion efficiency that should result from within a fresh device ($\eta_{NO}$) under current conditions, a calibratable threshold factor (A), existing between zero and one, can be utilized to indicate a malfunction in the device. An exemplary equation that can be utilized to describe a malfunction conversion efficiency is expressed as follows.

$$1 - \eta_{malf\_predicted} = A*(1-\eta_{NO}) \quad [6]$$

Solving this equation for $\eta_{malf\_predicted}$ yields the following equation.

$$\eta_{malf\_predicted} = 1 - A*(1-\eta_{NO}) \quad [7]$$

Using either of the above exemplary methods, a malfunction conversion efficiency can be utilized to determine a conversion efficiency value indicating a malfunction in an aftertreatment device under a set of operating conditions.

Figure 3:
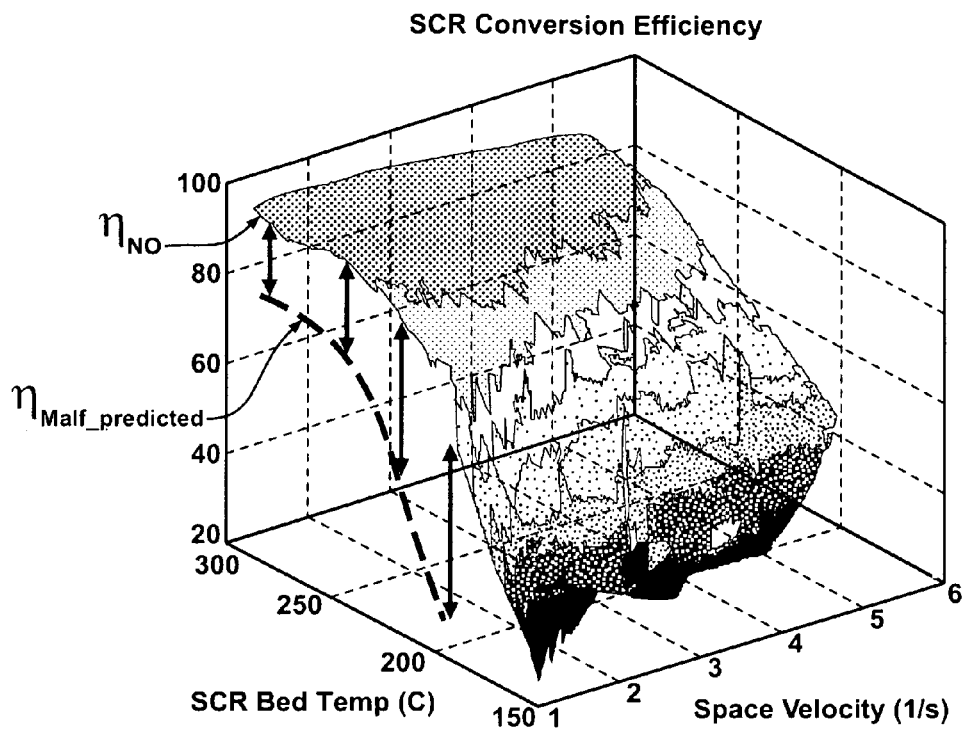
FIG. 3 graphically illustrates exemplary test data relating conversion efficiency to catalyst bed temperature and space velocity in an exemplary SCR, in accordance with the present disclosure.

FIG. 3 graphically illustrates exemplary test data relating conversion efficiency to catalyst bed temperature and space velocity in an exemplary SCR, in accordance with the present disclosure. The three-dimensionally projected surface describes conversion efficiency within an exemplary fresh SCR. In a two-dimensional plane wherein SV equals one, an exemplary data curve is depicted illustrating behavior of a malfunction catalyst. Utilizing such test data or exemplary data gathered in a vehicle through normal operation, a comparison of measured conversion efficiency to nominal conversion efficiency can yield a determination of a malfunction catalyst within an aftertreatment device.

As described above, an integration of x and y terms can utilized to apply a low pass filter in determining an actual conversion efficiency. A similar method can be employed in determining a malfunction conversion efficiency. Utilizing a known or predicted behavior of a device, utilizing data such as described in FIG. 3 to generate a predicted malfunction conversion efficiency, and monitoring an x(t) input, a predicted $y_{malf}(t)$ can be described based upon current operating conditions. An exemplary embodiment of an equation describing this prediction can be expressed as follows.

$$y_{malf}(t) = (1-\eta_{malf\_predicted})*x(t) \quad [8]$$

By integrating this term through a time period, a threshold total NOx exiting the aftertreatment can be described as $\int y_{malf}(t)*dt$. By comparing measured or actual NOx exiting from the aftertreatment system to this threshold term, an indication of a malfunction catalyst can be performed. Additionally, a filtered $\eta_{malf\_predicted}$ term can be determined. This calculation can be expressed as follows.

$$\eta_{malf\_predicted} = 1 - \frac{\int y_{malf}(t)*dt}{\int x(t)*dt} \quad [9]$$

This term yields a predicted conversion efficiency that a threshold malfunctioning catalyst would exhibit with given x(t) values through a time period based upon $\eta_{malf\_predicted}$ from a model predicting device behavior. In this way, a malfunction conversion efficiency can be determined based upon x(t) values through a time period, thereby eliminating false malfunction catalyst indications transient or noisy x(t) signals.

Figure 4:
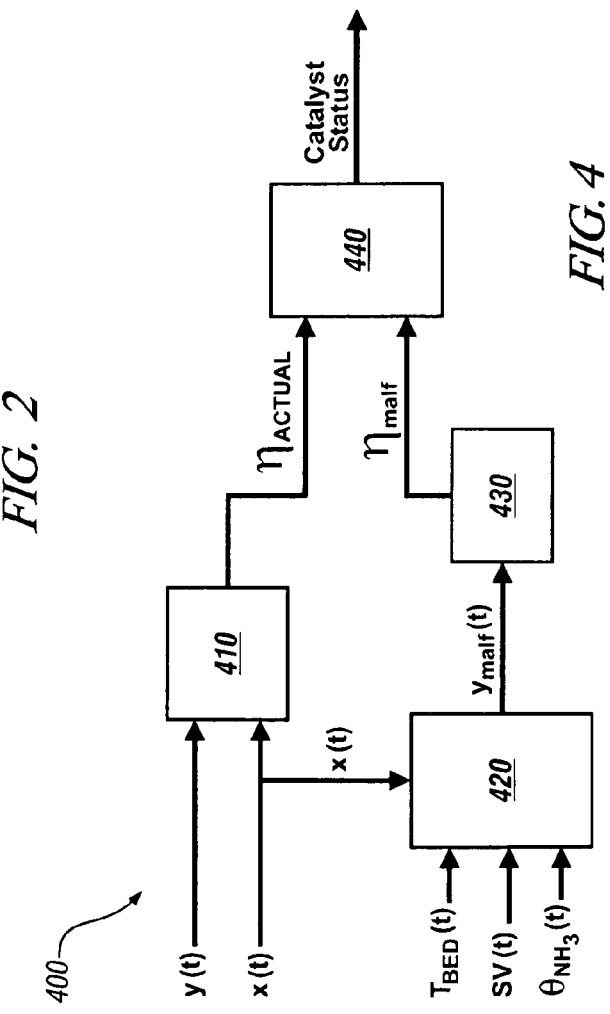
FIG. 4 illustrates an exemplary information flow diagnosing a malfunction catalyst through methods described herein, utilizing measured actual conversion efficiency, in accordance with the present disclosure.

The above methods to determine a measured or actual conversion efficiency and to determine a malfunction conversion efficiency can be utilized together to diagnose a malfunction catalyst in an aftertreatment device. If an actual conversion efficiency is below a malfunction conversion efficiency for current operating conditions, then a malfunction catalyst can be indicated. FIG. 4 illustrates an exemplary information flow diagnosing a malfunction catalyst through methods described herein, in accordance with the present disclosure. Information flow 400 comprises an actual conversion efficiency module 410, a conversion efficiency model module 420, an integrated diagnostic threshold module 430, and a comparator module 440. Actual conversion efficiency module 410 monitors inputs x(t) and y(t), describing NOx entering and exiting an aftertreatment system, respectively. Applying Equation 1 or, preferably, Equation 2 above, a $\eta_{ACTUAL}$ term is determined. Simultaneously, conversion efficiency model module 420 monitors inputs regarding $T_{BED}(t)$, $SV(t)$, and $\theta_{NH_3}$ and applies a calibrated model describing conversion efficiency $\eta_{malf\_predicted}$ under current operating conditions. A $y_{malf}(t)$ term, describing a NOx exiting the aftertreatment system term that would indicate a catalyst malfunction calculated according to exemplary Equation 8, is developed and output from module 420 to integrated diagnostic threshold module 430. Integrated diagnostic threshold module 430 applies an integration of $y_{malf}(t)$ through a time period and determines a $\eta_{malf\_predicted}$ term. $\eta_{ACTUAL}$ and $\eta_{malf\_predicted}$ are compared in comparator module 440. If $\eta_{ACTUAL}$ is greater than $\eta_{malf\_predicted}$, then the catalyst is determined to be in a normal state. If $\eta_{ACTUAL}$ is less than $\eta_{malf\_predicted}$, then the catalyst is determined to be a malfunction catalyst, and a malfunction indication is generated. This determination can be made continuously, at recurring intervals, or can be initiated upon certain events like an engine start-up event. Additionally or alternatively, it will be appreciated that integrals of the outputs of modules 410 and 430 can be utilized to evaluate conversion efficiency over a time period as compared to a threshold conversion efficiency through that period.

An additional exemplary method to indicate a malfunction catalyst is provided. As described above in Equation 7, a factor A can be utilized to determine a $\eta_{malf\_predicted}$ term in relation to a known $\eta_{NO}$ value. This relationship can be rearranged into the following equation.

$$A = \frac{1 - \eta_{malf\_predicted}}{1 - \eta_{NO}} \quad [10]$$

A rearrangement of Equation 10 and an equivalent expression of $\eta_{NO}$ and an integration of $y_{NO}(t)$ values, fed into Equation 9, yield the following equation.

$$A = \frac{\int y_{malf}(t) * dt}{\int x(t) * dt} \div \frac{\int y_{NO}(t) * dt}{\int x(t) * dt} = \frac{\int y_{malf}(t) * dt}{\int y_{NO}(t) * dt} \quad [11]$$

The term $y_{NO}(t)$ can be estimated based upon the models described by Equations 3, 4 or 5 and $x(t)$. Based upon Equation 11, given a calibrated A value and a predicted integration of $y_{NO}(t)$ through a time period, a predicted threshold value for an integration of $y_{malf}(t)$ can be determined describing a quantity of NOx exiting the aftertreatment system in a malfunctioning catalyst. By comparing a measure of actual NOx exiting the aftertreatment system to a predicted threshold NOx exiting the aftertreatment system for malfunction catalyst, a determination can be made whether the catalyst being monitored is malfunctioning.

Figure 5:
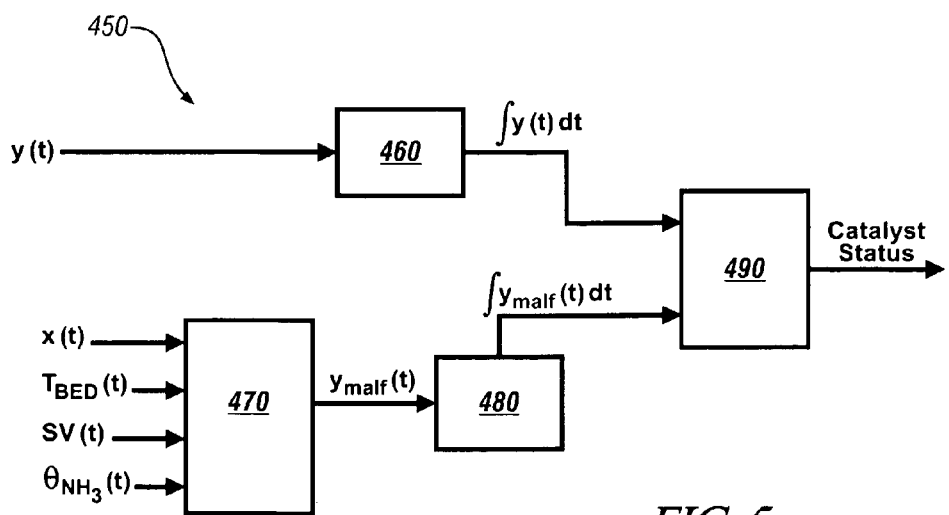
FIG. 5 illustrates an exemplary information flow diagnosing a malfunction catalyst through methods described herein, utilizing measured NOx content downstream of an SCR device, in accordance with the present disclosure.

Utilizing the above methods to determine an actual NOx exiting the aftertreatment system and to determine a predicted threshold NOx exiting the aftertreatment system for malfunction catalyst can be utilized together to diagnose a malfunction catalyst in an aftertreatment device. If the actual NOx exiting the aftertreatment system is greater than the predicted threshold NOx exiting the aftertreatment system for malfunction catalyst for current operating conditions, then a malfunction catalyst can be indicated. FIG. 5 illustrates an exemplary information flow diagnosing a malfunction catalyst through methods described herein, in accordance with the present disclosure. Information flow 450 comprises an actual NOx determination module 460, a conversion efficiency model module 470, an integrated diagnostic threshold module 480, and a comparator module 490. Actual NOx determination module 460 monitors $y(t)$, describing NOx exiting an aftertreatment system. Integrating $y(t)$, a $\int y(t)*dt$ term is determined. Simultaneously, conversion efficiency model module 470 monitors inputs regarding $x(t)$, $T_{BED}(t)$, $SV(t)$, and $\theta_{NH3}(t)$ and applies a calibrated model describing conversion efficiency $\eta_{malf\_predicted}$ for a malfunction device. $\eta_{malf\_predicted}$ can be determined by methods described herein. A $y_{malf}(t)$ term, describing a NOx exiting the aftertreatment system term that would indicate a catalyst malfunction is developed and output from module 470 to integrated diagnostic threshold module 480. Integrated diagnostic threshold module 480 applies an integration of $Y_{malf}(t)$ through a time period and outputs a $\int y_{malf}(t)*dt$ term. $\int y(t)*dt$ and $\int y_{malf}(t)*dt$ are compared in comparator module 490. If $\int y(t)*dt$ is less than $\int y_{malf}(t)*dt$, then the catalyst is determined to be in a normal state. If $\int y(t)*dt$ is greater than $\int y_{malf}(t)*dt$, then the catalyst is determined to be a malfunction catalyst, and a malfunction indication is generated. This determination can be made continuously, at recurring intervals, or can be initiated upon certain events like an engine start-up event.

The method described in association with FIG. 5 includes $x(t)$ or a measure of NOx entering the aftertreatment system. However, it should be noted that this term is utilized to generate an accurately predicted $y_{malf}(t)$ term for later integration. In the event that the $x(t)$ term is unavailable or determined to be unreliable, an alternative estimation of $y_{malf}(t)$ or $\int y_{malf}(t)*dt$ can otherwise be determined for comparison to $\int y(t)*dt$. For example, a predicted threshold NOx exiting from the aftertreatment system could be generated based upon a look-up table and certain engine operating characteristics detailing NOx production. Some of these exemplary characteristics are described below in sections detailing operation of a virtual NOx sensor, and some or all of these factors could likewise be utilized to estimate the predicted threshold term in lieu of a malfunctioning sensor.

As described above, reduced conversion efficiency or NOx presence downstream of an SCR device can be utilized to indicate a malfunction catalyst. However, reduced efficiency can be caused by other factors, and a method to distinguish between reduced efficiency caused by a malfunction catalyst and reduced efficiency caused by other factors is desirable in avoiding false indications. A method to avoid false indications of a malfunction catalyst includes monitoring a factor or factors other than a malfunction catalyst that can cause reductions in conversion efficiency of an SCR device and initiating a diagnostic test to indicate a malfunction catalyst only if the monitoring does not indicate one of the factors leading to false malfunction catalyst indication.

As described in association with Equation 3, a number of factors or conditions affect conversion efficiency in an SCR device. For example, catalyst bed temperature significantly impacts reactions taking place within the SCR device. Additionally, the quantity of ammonia stored on the catalyst is directly related to the conversion efficiency of the device. While determinations can be made such as the relationship expressed by Equation 5 taking factors or conditions into account while continuing to perform diagnostic tests for a malfunction catalyst, NOx conversion in transient or improper conditions can be erratic. A condition or set of conditions disabling operation of a malfunction catalyst diagnostic test can reduce occurrence of false malfunction catalyst indications.

One factor in describing operation of an SCR is an ammonia storage level. While a non-malfunction catalyst is necessary for normal operation of an SCR device, presence of an adequate quantity of ammonia is also necessary for normal operation. $\theta_{NH3}$ can be estimated, for example, by analyzing ammonia adsorbtion and desorbtion rates, NOx conversion rates, and adsorbed ammonia oxidation rates. $\theta_{NH3}$ is most accurately monitored through modeling of relevant variables such as $V_{UREA}$, $T_{BED}$, x(t), and characteristics of the SCR device including an ammonia storage capacity and $\rho_{CELL}$. Because the presence of ammonia, the reductant in the chemical reaction, in sufficient quantities on the catalyst is a prerequisite to normal conversion of NOx in an SCR device, a lack of sufficient ammonia, when known, can be utilized to disable operation of a malfunction catalyst diagnostic test until sufficient ammonia is deposited on the catalyst.

The quantity of ammonia required for normal operation of the SCR device depends greatly upon the particular SCR device utilized and the flow of NOx that requires conversion. Values defining a threshold quantity of ammonia may be developed experimentally, empirically, predictively, through modeling or other techniques adequate to accurately predict aftertreatment system or SCR device operation, and a multitude of ranges or values might be used by the same system different settings, conditions, or operating ranges. In order to sustain the required catalytic reaction, a molar quantity of ammonia must be available in roughly a one to one ratio with a molar quantity of NOx entering the device. An exemplary expression of a quantity of ammonia required to efficiently operate the SCR device ($S_{NH3}$) can be given by the following functional relationship.

$$S_{NH3}=f(T_{BED},SV) \quad [12]$$

In this way, $S_{NH3}$ can be predicted based upon various factors describing NOx conversion. A comparison of $S_{NH3}$ and $\theta_{NH3}$, for example, determining whether $\theta_{NH3}$ is at least equal to $S_{NH3}$, can be an exemplary condition utilized to disable operation of a malfunction catalyst diagnostic test until sufficient ammonia is deposited on the catalyst.

Comparison of $S_{NH3}$ and $\theta_{NH3}$ can be used to identify a gap in ammonia storage require to efficiently operate the SCR device and estimated ammonia storage on the catalyst. However, it will be appreciated that $\theta_{NH3}$ is an estimate and can contain estimation error. An exemplary method is disclosed for testing the accuracy of $\theta_{NH3}$. A control adaptation cycle can be operated to intrusively test which side of a desired ammonia storage level the actual storage level exists. Because the control adaptation cycle is intrusive and requires modulation of the aftertreatment process, the cycle is preferably not performed as a precondition to every occurrence of every malfunction catalyst diagnostic test, as the intrusive operation would be disadvantageous to normal operation of the powertrain. One method to utilize such a test includes operating a malfunction test in accordance with other enabling conditions, and upon a single or some defined number of malfunction catalyst indications, operating a control adaptation cycle before a subsequent malfunction catalyst diagnostic test. The control adaptation cycle in this latter condition can be used to test the accuracy of $\theta_{NH3}$. By analyzing this accuracy, the earlier malfunction catalyst indications can be validated or invalidated, and identified inaccuracies can be utilized to disable operation of a malfunction catalyst diagnostic test, for example, if the accuracy degrades by more than a threshold accuracy measure, until normal accuracy of $\theta_{NH3}$ can be restored. It will be noted that sensors capable of measuring $\theta_{NH3}$ directly or measuring accuracy of $\theta_{NH3}$ directly in a non-intrusive test could be used as a condition to the malfunction catalyst diagnostic test similarly to other tests described herein. However, known sensors include cross sensitivity which creates potential for inaccurate evaluations of $\theta_{NH3}$ estimation accuracy. In this way, an evaluation of the accuracy of $\theta_{NH3}$ can be utilized to disable operation of a malfunction catalyst diagnostic test until the estimation can be restored to acceptable accuracy.

As described herein, reductant such as ammonia introduced through urea injection is used to create the necessary reactions within the SCR device to convert NOx. However, it will be appreciated by one having skill in the art that ammonia, hydrocarbon based reductants, or other reductants can be introduced to the aftertreatment system by methods other than urea injection. For example, under certain operating conditions, ammonia is known as a by-product of combustion within the engine and use of known aftertreatment catalysts. In a method utilizing ammonia generation cycles to generate ammonia within the powertrain without injection of reductant, the ammonia generation cycles can be monitored or modeled, and estimated accumulation of ammonia through the ammonia generation cycles can be utilized to disable operation of a malfunction catalyst diagnostic test until ammonia storage is restored to normal levels. Similarly, in systems utilizing other reductants, generation of the reductants can be monitored and utilized to disable the diagnostic test when appropriate according to methods described herein.

As described above, temperature of the catalyst or $T_{BED}$ is another factor in describing operation of an SCR. Temperatures below a normal operating range inhibit the chemical conversion processes in aftertreatment devices, and in particular, the conversion of NOx by ammonia through catalytic reaction within an SCR. Additionally, low temperatures can indicate an engine in a warm-up period, during which creation of NOx and other components of the exhaust gas flow can be abnormal or in transition. Temperatures above a normal operating range can cause high rates of ammonia slip or loss of stored ammonia from the catalyst to the downstream exhaust gas flow. As a result, temperatures either below or above a normal operating range for an SCR can be utilized to disable operation of a malfunction catalyst diagnostic test until temperatures return to the normal range. Such a temperature operating range can be defined by a low temperature threshold and a high temperature threshold.

Testing of $T_{BED}$ as a condition to disable operation of a malfunction diagnostic test can take many forms. For example, a temperature sensor directly within the SCR device can read temperatures and compare the temperatures to a threshold temperature. Temperatures outside the normal range can then be used to toggle an enable/disable parameter controlling the malfunction diagnostic test. In the alternative, $T_{BED}$ can be modeled based upon an exhaust gas temperature reading or readings taken at other locations in the aftertreatment system. Additionally or alternatively, such a model can take into account other variables such as exhaust gas flow rate and engine operation including speed and load. An exemplary expression of $T_{BED}$ can be given by the following functional relationship.

$$T_{BED}=f(T_1,T_2,M_{DOT\_EXH},T_{AMB},SCR\ Geometry) \quad [13]$$

$T_1$ describes temperature of the exhaust gas flow measured upstream of the SCR device, and $T_2$ describes temperature of the exhaust gas flow measured downstream of the SCR device. $M_{DOT\_EXH}$ describes a mass flow rate of exhaust gas through the SCR device and can be estimated or modeled based upon operation of the engine. $T_{AMB}$ describes a temperature of ambient conditions to the exhaust system and can be directly measured or determined based upon commonly measured values such as intake air temperature. Additionally, instead of utilizing instantaneous temperature measurements or estimations, a time weighted evaluation of $T_{BED}$ can be utilized, for example, an average value of $T_{BED}$ through a period, to approximate the effects of temperature on SCR operation. For example, a brief spike in $T_{BED}$ will not cause the same degree of ammonia slip in the SCR device as will a sustained period of elevated $T_{BED}$.

Values defining the normal operating range of $T_{BED}$ may be developed experimentally, empirically, predictively, through modeling or other techniques adequate to accurately predict aftertreatment system or SCR device operation, and a multitude of ranges or values might be used by the same system using different settings, conditions, or operating ranges. For example, in the case of temperature spikes, a spike of a certain level might be utilized as a threshold, and a lower threshold might be used for sustained periods of elevated temperatures. An exemplary value in one embodiment for the high end of the normal operating range is 350° C. and an exemplary embodiment for the low end of the normal operating range is 200° C. However, as described above, these numbers are largely dependent upon the specifics of the system involved.

As described above in relation to the time weighted evaluation of $T_{BED}$, conversion efficiency reduced due to high or low $T_{BED}$ values does not necessarily immediately return to normal conversion efficiency. For example, if $T_{BED}$ is elevated above the normal operating range of the SCR device for an extended period leading to depletion of ammonia from the catalyst, and then $T_{BED}$ reduces to within the normal operating range, the ammonia storage level can take time to recover to adequate levels required. Testing of $T_{BED}$ as a condition to disable operation of a malfunction diagnostic test can identify drops of $T_{BED}$ from a high temperature to normal temperatures, and a period of continued disabled operation of the malfunction diagnostic test can be maintained, either for a fixed period or until a predictive model of $\theta_{NH3}$ describes adequate replenishment of ammonia on the catalyst.

Transitory effects of $T_{BED}$ can adversely affect conversion efficiency. For example, rapidly increasing temperatures within an SCR device can affect ammonia concentrations within the device and adversely affect conversion efficiency despite $T_{BED}$ remaining within otherwise nominal ranges. Similarly, rapidly decreasing temperatures within an SCR device can adversely affect conversion efficiency through variability of conditions within the device.

Figure 6:
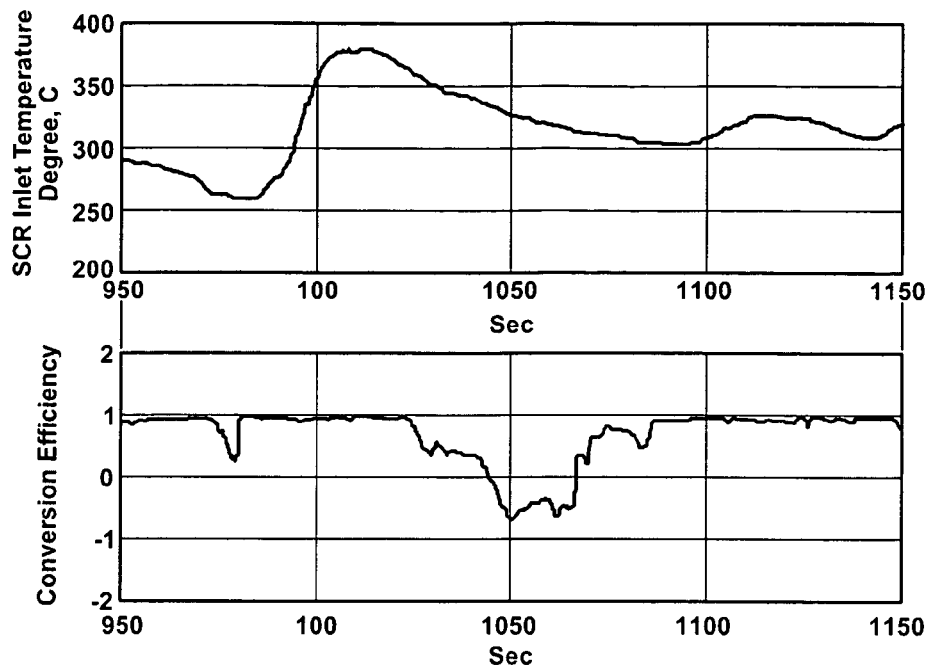
FIG. 6 graphically illustrates exemplary operation of an aftertreatment system including catalyst temperature and resulting conversion efficiency, in accordance with the present disclosure.

FIG. 6 graphically illustrates exemplary operation of an aftertreatment system including catalyst temperature and resulting conversion efficiency, in accordance with the present disclosure. The top portion of the graph illustrates changes in temperature within the SCR device. A rapid increase in temperature is illustrated, starting at approximately 980 seconds. The bottom portion of the graph shows resulting conversion efficiency in the SCR device. The rapid increase in temperature in the device is followed by a significant drop in conversion efficiency. An exemplary condition to disable a malfunction catalyst diagnostic test includes monitoring a rate of change in temperature within the SCR device and disabling the test for any rate of change in temperature in excess of a threshold rate of change. Another exemplary condition to disable a malfunction catalyst diagnostic test, based on an exemplary system as described herein where normal conversion efficiency is described by $T_{BED}$ between 200° C. and 350° C. includes a temperature dependent term, for example, requiring that $T_{BED}$ be greater than 300° C. and requiring a rate of increase in $T_{BED}$ in excess of a threshold rate of increase. In FIG. 6, rate of temperature increase is described by the slope of the line in the top portion of the graph. The temperature dependent term and the threshold rate of temperature increase can be calibrated, for example, through analysis of a data such as is described by FIG. 6, or the values can be set by a model sufficient to describe operation and conversion efficiency of an SCR device. Similary, rapid decreases in temperature within an SCR device can be analyzed and utilized to disable the diagnostic test. In this way, transient increases in $T_{BED}$ can be utilized to disable the diagnostic test based upon resulting effects on conversion efficiency.

Transient behavior of $T_{BED}$ can cause reductions in conversion efficiency in an SCR device. Similarly, changes in engine speed can affect conversion efficiency. Engine speed acceleration creating a high temperature in the exhaust gas flow can cause ammonia slip and, thereby, affect conversion efficiency. Additionally, engine deceleration, in particular, including fuel cutoff to the combustion chambers, can reduce engine out NOx significantly, in some cases almost completely, leading to inaccurate measurement of conversion efficiency and can cause loss of stored ammonia. As a result, the monitored efficiency is very low or inaccurate through the transition. Disabling the diagnostic test and including a delay until the engine resumes acceleration is preferable. Monitoring changes in engine speed as a condition to disable operation of a malfunction diagnostic test can identify conditions wherein conversion efficiency is adversely affected by transient engine operation.

Figure 7:
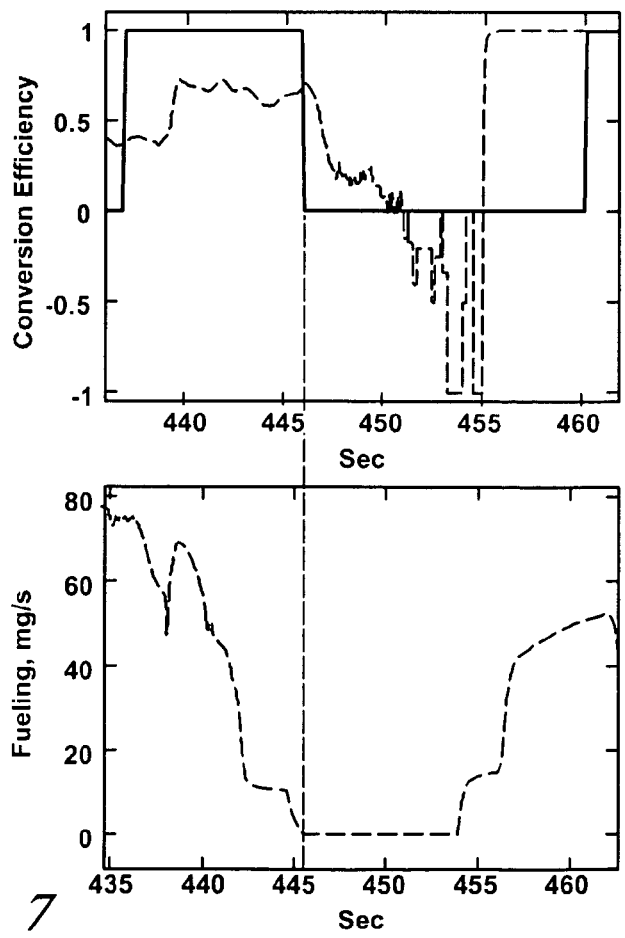
FIG. 7 graphically illustrates a rapid deceleration of an engine resulting from a rapid decrease in fueling of the engine and resulting changes in conversion efficiency, in accordance with the present disclosure.

FIG. 7 graphically illustrates a rapid deceleration of an engine resulting from a rapid decrease in fueling of the engine and resulting changes in conversion efficiency, in accordance with the present disclosure. The top portion of the graph depicts a fueling rate to the engine. Fueling is a direct indication of engine output, and a sharp decrease in fueling corresponds to a rapid decrease in engine output and exhaust gas output. The bottom portion of the graph depicts resulting conversion efficiency. As described above, rapid decreases in engine speed result in variable or unpredictable operation of the SCR device. In the exemplary data of FIG. 7, a decrease in fueling in the top portion of the graph results in a subsequent reduction in conversion efficiency. Such a reduction in fueling can be utilized to disable a malfunction catalyst diagnostic test. For example, in the bottom portion of FIG. 7, a binary enabled/disabled indicator is depicted. In the exemplary embodiment depicted, the diagnostic test disable criteria is set to fueling equals zero and continues for some delay period. An alternative diagnostic test disable criteria could include a threshold indicative of a low fueling rate and disable the test if the fueling rate drops below the threshold. Such a threshold could be fixed or variable based upon recent fueling rates. In this way, fueling decreases describing decelerations in engine operation can be utilized to disable the diagnostic test based upon resulting effects on conversion efficiency.

Figure 8:
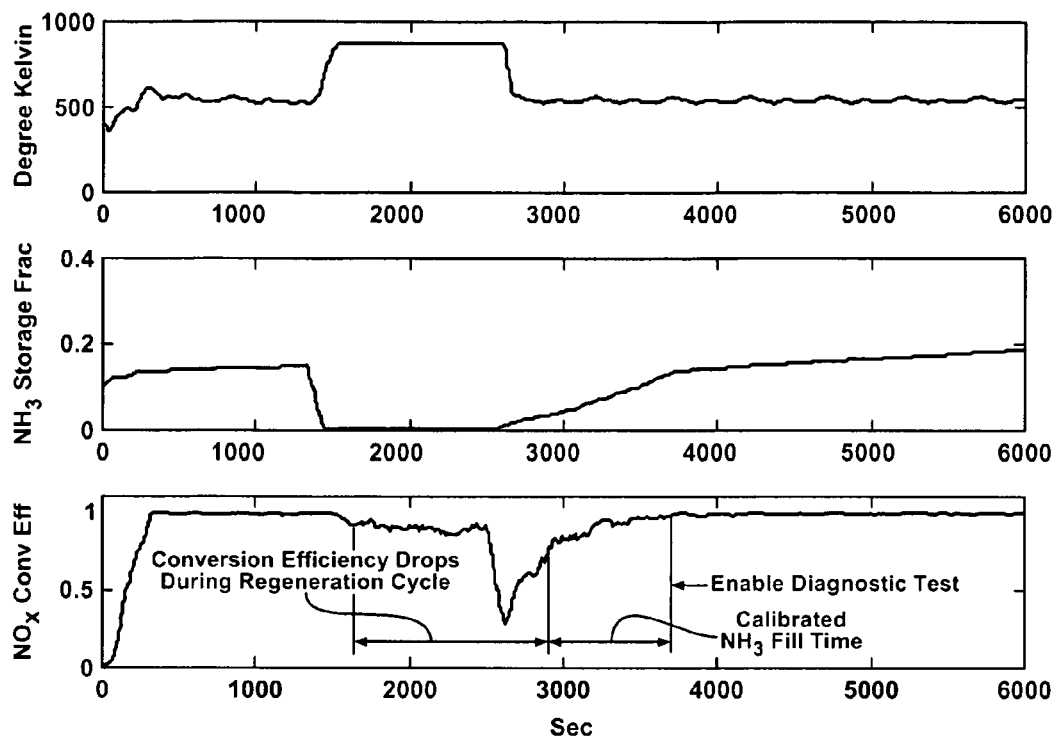
FIG. 8 graphically illustrates an exemplary regeneration cycle in an aftertreatment system and disabling of a diagnostic test based upon the regeneration cycle, in accordance with the present disclosure.

As described above, exemplary aftertreatment devices include use of regeneration cycles to purge stored contaminants. For example, a DPF stores unburned hydrocarbons and soot within the DPF, and a periodic high temperature regeneration cycle is utilized to clean the contaminants from the DPF. In some exemplary aftertreatment systems, this high temperature exhaust passes through the SCR device and causes high ammonia slip. In other exemplary aftertreatment systems, a bypass circuit can be used to protect the SCR device and other aftertreatment devices sensitive to damage from the high temperature regeneration cycle. However, the use of such a bypass valve will interfere with the conversion efficiency of the SCR device. As a result, detection of a high temperature regeneration cycle within the aftertreatment system can be utilized to disable operation of a malfunction catalyst diagnostic test until the regeneration cycle is ended. FIG. 8 graphically illustrates an exemplary regeneration cycle in an aftertreatment system and disabling of a diagnostic test based upon the regeneration cycle, in accordance with the present disclosure. Three portions of the graph depict the regeneration cycle against a common timescale. A top portion of the graph depicts $T_{BED}$ through the regeneration cycle. In the center of the top portion, a period of sharply increased temperatures correlate to elevated exhaust gas temperatures achieving a purging regeneration of the aftertreatment system. The center portion of the graph depicts an ammonia storage fraction describing the fraction of ammonia storage capacity of the catalyst currently being utilized. As described above, elevated $T_{BED}$ values result in elevated ammonia slip. As a result, during the regeneration cycle, the ammonia storage fraction drops sharply. The bottom portion of the graph depicts conversion efficiency through the regeneration cycle. A drop in conversion efficiency during the regeneration cycle is evident. After the completion of the regeneration cycle, the conversion efficiency does not recover immediately after $T_{BED}$ values reduce. Instead, reductant injection over time through a fill time is required to restore ammonia on the catalyst to normal levels. The graph illustrates that conversion efficiency is known to drop through a regeneration cycle and through a fill time after the regeneration cycle due to the high temperatures of the exhaust gas flow through the cycle. Disabling of a malfunction catalyst diagnostic test through a regeneration cycle and through a calibrated fill time after the regeneration cycle can in this way be utilized to avoid false indications of a malfunction catalyst.

NOx in the exhaust gas flow includes NO and $NO_2$. Utilization of ammonia in an SCR device is more efficient at converting $NO_2$ than converting NO. A ratio of NO to $NO_2$ entering an SCR device can be used to estimate a resulting NOx conversion efficiency. A threshold NO to $NO_2$ ratio can be can be utilized to disable operation of a malfunction catalyst diagnostic test until the ratio returns to a level conducive to normal NOx conversion.

Figure 9:
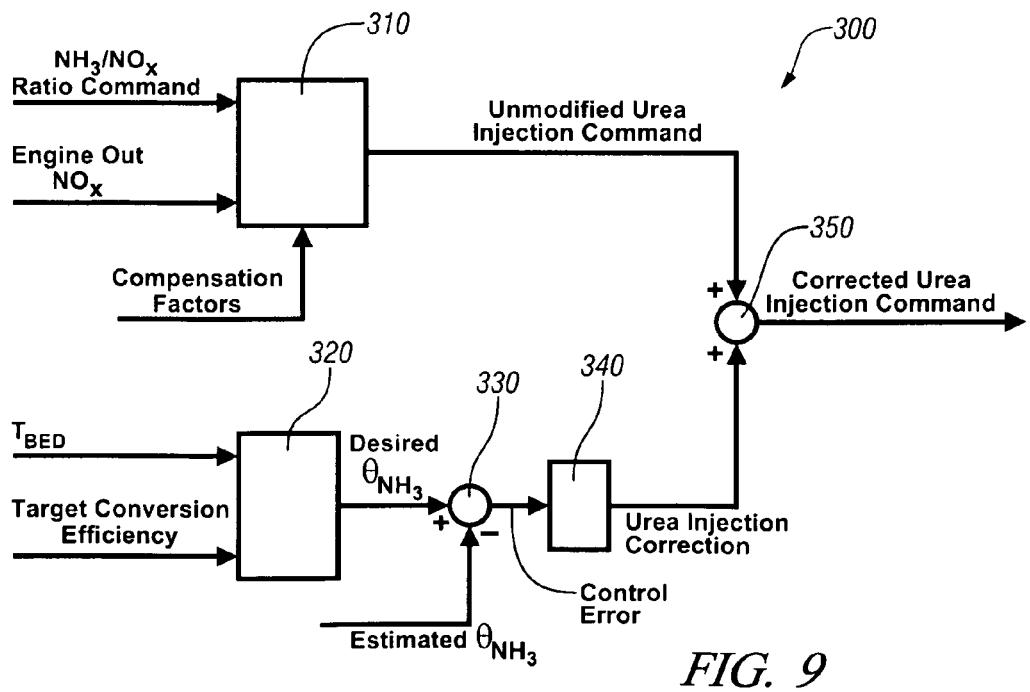
FIG. 9 illustrates an exemplary data flow utilized to control urea injection in order to accomplish a desired ammonia storage level in an SCR, in accordance with the present disclosure.

Ammonia stored on the catalyst, tracked as $\theta_{NH3}$, is controlled according to a desired value. FIG. 9 illustrates an exemplary data flow utilized to control urea injection in order to accomplish a desired ammonia storage level in an SCR, in accordance with the present disclosure. Information flow 300 comprises target urea injection module 310 determining an unmodified urea injection command based upon engine out NOx and desired ammonia storage module 320, ammonia storage summation module 330, and ammonia to urea conversion module 340 determining a urea injection correction term. Information flow 300 sums the unmodified urea injection command and the urea injection correction term to determine a corrected urea injection command. Target urea injection module 310 monitors engine out NOx, utilizes a $NH_3$ to NOx ratio command, incorporates any compensation factors, and determines an unmodified urea injection command. Engine out NOx can be directly measured or can be estimated through modeling of engine operation, such as through a virtual NOx sensor as described herein. The $NH_3$ to NOx ratio command describes the chemical reaction accomplishing NOx conversion, and as described above, this ratio will preferably be close to one to one. Compensation factors include any determinable effects that change the amount of ammonia required in the SCR device required for efficient NOx conversion. Module 310 utilizes these monitored terms to estimate a urea injection that will deliver a required quantity of ammonia to the catalyst. However, conditions within the SCR device can change the amount of urea actually required to produce the ammonia storage on the catalyst required for NOx conversion. Module 320 monitors $T_{BED}$ and a target conversion efficiency. Module 320 processes these monitored inputs and determines a desired $\theta_{NH3}$ to meet the target conversion efficiency. Module 320 can include calibrated look-up tables or a programmed model describing conversion efficiencies known to result from $T_{BED}$ and $\theta_{NH3}$ according to methods described herein. Ammonia storage summation module 330 compares the desired $\theta_{NH3}$ term from module 320 and an estimated $\theta_{NH3}$ term and outputs a control error term. The control error term describes the difference between the desired $\theta_{NH3}$ term and the estimated $\theta_{NH3}$ term or a change in $\theta_{NH3}$ required to reach the desired $\theta_{NH3}$ term. The control error term quantifies a difference in ammonia storage. Ammonia to urea conversion module 340 converts the control error term to a urea injection correction term. Summing module 350 adds the unmodified urea injection command and the urea injection correction term to create a corrected urea injection command, quantifying a urea amount to be injected based upon engine out NOx and the control error. In this way, urea injection can be controlled in order to efficiently convert NOx.

The control error term described above describes a difference or deviation of an estimated $\theta_{NH3}$ term and a desired $\theta_{NH3}$ term. For a number of reasons, instability or transient conditions can cause variation in actual ammonia storage. According to the methods described above, disabling operation of a malfunction catalyst diagnostic test in periods of instability or when factors other than a malfunction catalyst cause changes in conversion efficiency can avoid false indications of a malfunction catalyst. A method is disclosed to compare the control error to a threshold control error, and if the control error exceeds the threshold term, to disable the malfunction catalyst diagnostic test until the control error is reduced.

As described herein, engine out NOx can be measured or estimated based upon engine operation. Engine out NOx faults can be identified wherein engine out NOx either exceeds a normal range or a sensor malfunction creates processing issues not conducive to accurately testing conversion efficiency. Monitoring engine out NOx faults, through any combination of engine or aftertreatment operating parameters indicative of estimated or actual NOx generation, can be utilized to disable operation of a malfunction catalyst diagnostic test until the engine out NOx returns to normal levels.

Figure 10:
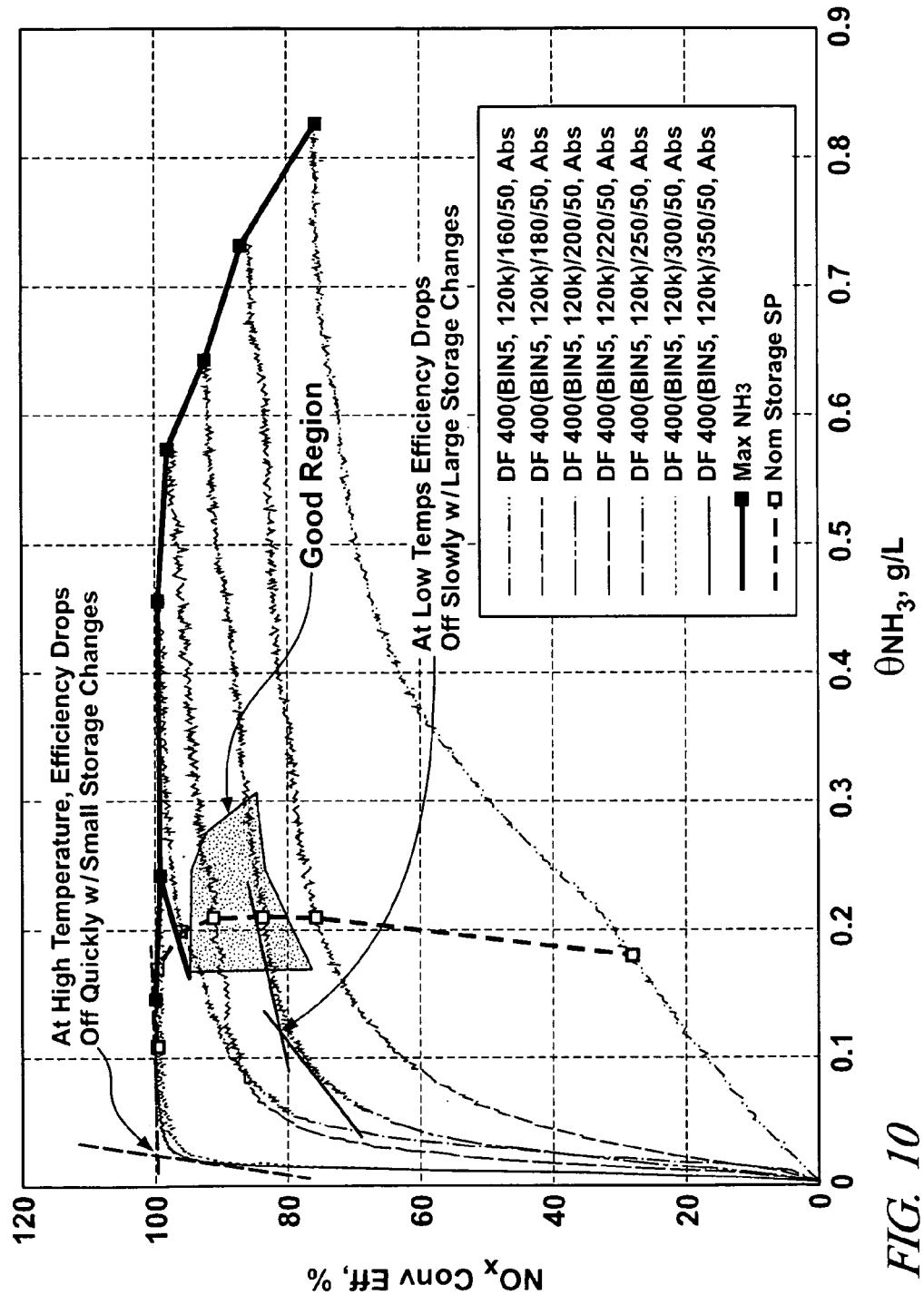
FIG. 10 graphically illustrates exemplary operation of an SCR device through a range of ammonia storage values and catalyst bed temperatures, in accordance with the present disclosure.

As described in the exemplary conditions utilized to disable operation of a malfunction catalyst diagnostic test, factors affecting conversion efficiency of the SCR device can be used to identify conditions wherein a reduced conversion efficiency or instability in conversion efficiency can be attributed to sources other than a malfunction catalyst. These factors can be used in isolation, each factor utilized in comparison to thresholds or operating ranges to estimate normal operation in the SCR device. Alternatively or additionally, a plurality of factors can be utilized together to evaluate normal operation of an SCR device within a range conducive to diagnosing a malfunction catalyst. FIG. 10 graphically illustrates exemplary operation of an SCR device through a range of ammonia storage values and catalyst bed temperatures, in accordance with the present disclosure. NOx conversion efficiency is depicted against $\theta_{NH3}$, and a number of data plots are depicted showing SCR devices with various $T_{BED}$ values. As depicted along each data plot, reductions in ammonia present on the catalyst lead to reductions in conversion efficiency. As depicted between the data plots, changes in temperature affect a resulting conversion efficiency for a given $\theta_{NH3}$ value. Additionally, a preferred $\theta_{NH3}$ plot is depicted, describing a preferred amount of ammonia that can be targeted to be maintained upon the catalyst. It will be appreciated that the preferred $\theta_{NH3}$ plot to which ammonia storage is controlled is a function of conversion efficiencies required of the powertrain, for example, as a result of regulations, reductant injection required to achieve the required conversion efficiency, ammonia slip rates, and other operational characteristics of the SCR device and the powertrain utilizing the device. Based upon limitations in $T_{BED}$, $\theta_{NH3}$ and normal operation of reductant delivery to the targeted value, a normal region of operation can be defined wherein operation of the SCR device and resulting conversion efficiency are within normal, stable ranges and wherein a malfunction catalyst diagnostic test is appropriate. Operation within this region can be can be utilized to disable operation of a malfunction catalyst diagnostic test until operation can be controlled back into this range.

Figure 11:
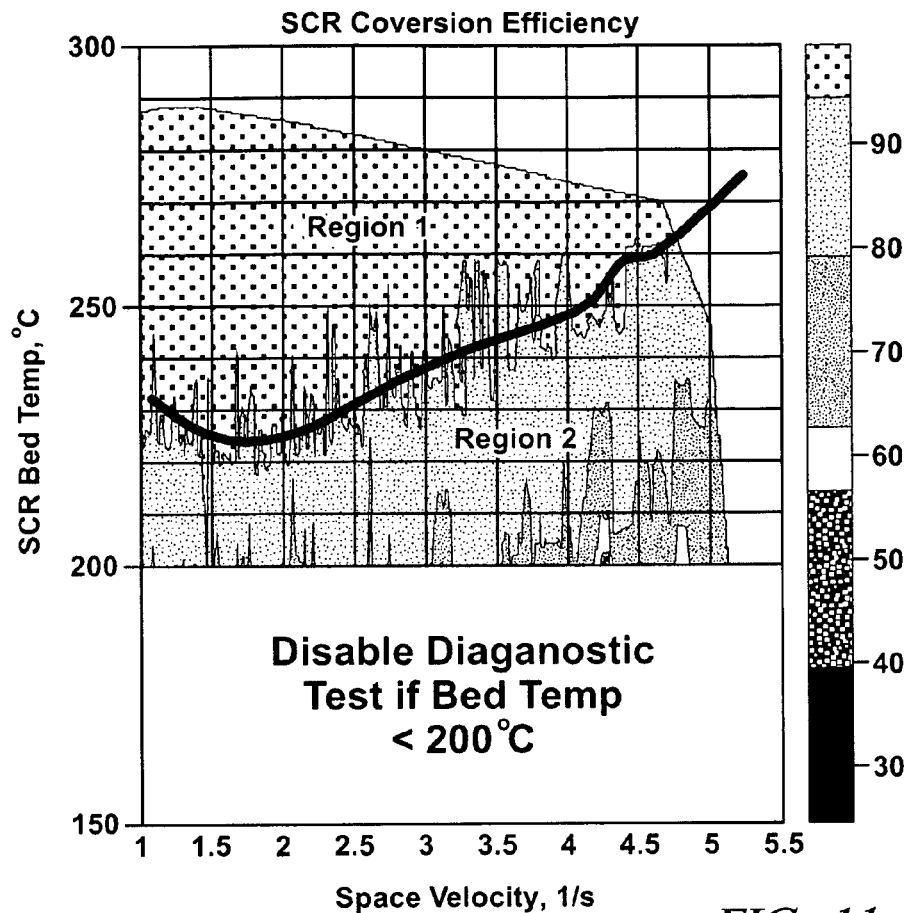
FIG. 11 graphically illustrates exemplary operation of an SCR device through a range of space velocity values and catalyst bed temperatures, in accordance with the present disclosure.

Similarly, $T_{BED}$ and SV can be utilized together to evaluate normal operation of an SCR device within a range conducive to diagnosing a malfunction catalyst. FIG. 11 graphically illustrates exemplary operation of an SCR device through a range of space velocity values and catalyst bed temperatures, in accordance with the present disclosure. As described above, high temperatures within the SCR device, as indicated by $T_{BED}$, increase ammonia slip and are not preferable to run a malfunction catalyst diagnostic test. Similarly, high SV values also increase ammonia slip and create conditions not preferable to run a malfunction catalyst diagnostic test. FIG. 11 illustrates conversion efficiency through ranges of $T_{BED}$ and SV values. As is evident in the data, $T_{BED}$ and SV have a cumulative effect upon conversion efficiency. A method is disclosed to utilize dynamic thresholds in $T_{BED}$ and SV to disable operation of a malfunction diagnostic test can identify conditions wherein conversion efficiency is adversely affected by $T_{BED}$ and SV. As demonstrated in FIG. 11, Region 1 can be defined wherein a high conversion efficiency is maintained. Outside of this region, effects of $T_{BED}$ and SV can adversely affect or create instability in conversion efficiency such that disabling operation of a malfunction diagnostic test can avoid false malfunction catalyst indications. Above Region 1 indicates operation wherein $T_{BED}$ and SV significantly reduce conversion efficiency, for example, by causing excessive ammonia slip. Below the region indicates operation wherein $T_{BED}$ and SV significantly reduce conversion efficiency, for example, through low temperature causing inefficient conversion and high space velocities causing unstable conditions in the device or causing NOx to blow through the SCR device before conversion can occur. In the specific exemplary data of FIG. 11, a Region 2 is defined wherein conversion efficiency is variable or not necessarily at higher values. Aftertreatment systems are frequently optimally designed to operate in stable regions of high conversion efficiency, such as Region 1. Aftertreatment systems will operate in exemplary Region 2 during transitory or warming-up periods. While testing in stable Region 1 is favorable due to the predictably high conversion efficiency afforded by the $T_{BED}$ and SV values, testing has shown that conversion efficiency in this region, due to the favorable temperature and SV conditions, are not necessarily highly affected by a malfunction catalyst. This efficient operation despite a malfunction catalyst results in reduced resolution in a malfunction catalyst diagnostic test. Alternatively, conversion efficiency in a non-optimal region of operation, such as exemplary transitory Region 2 of FIG. 11, can be more significantly affected by a malfunction catalyst. As a result, although conversion efficiencies of a normal catalyst are lower and perhaps more variable in a transitory region such as Region 2, operation of the diagnostic test in such a region can be useful to identifying a malfunction catalyst. In such a case, it can be preferable not to disable the diagnostic test in such a region, but rather to carefully select threshold conversion efficiencies or perform redundant tests in the region to account for variability in the region while taking advantage of the increased diagnostic test resolution. In the ways described above, by estimating or modeling $T_{BED}$ and SV, a comparison can be made to a dynamic threshold to disable or enable the diagnostic test, with a stable disabling criteria being applied in a stable region and a transitory disabling criteria being applied in a transitory region.

Figure 12:
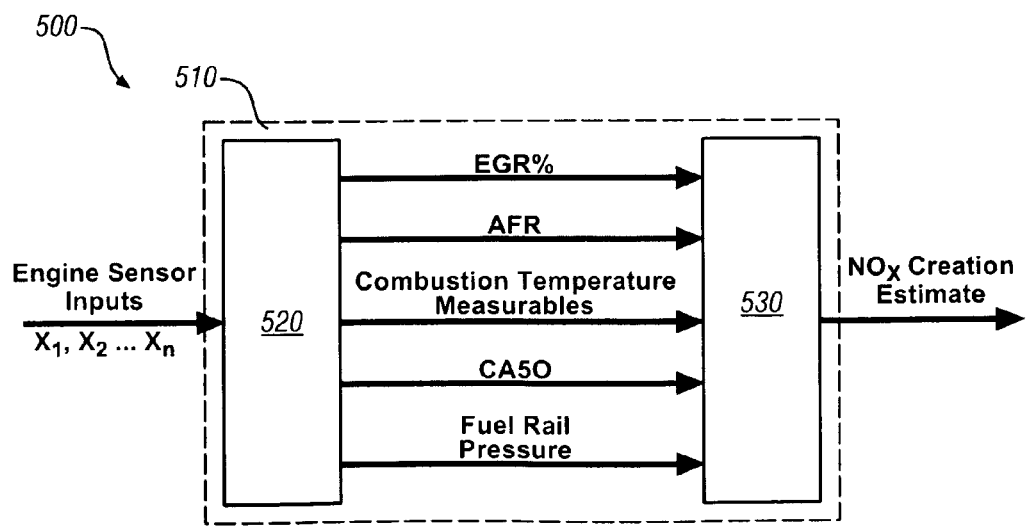
FIG. 12 schematically depicts an exemplary NOx model module, utilized within an engine control module and determining a NOx creation estimate, in accordance with the present disclosure.

A NOx sensor or an oxygen sensor add cost and weight to a vehicle, and such sensors frequently require a particular operating temperature range, achieved after some warm-up time, to be functional. As described above a virtual NOx sensor can be used to estimate the presence of NOx in an aftertreatment system. FIG. 12 schematically depicts an exemplary NOx model module, utilized within an engine control module and determining a NOx creation estimate, in accordance with the present disclosure. Exemplary NOx model module 500 is operated within NOx creation estimating system 510 and comprises a model module 520 and a NOx estimation module 530. Engine sensor inputs $x_1$ through $x_n$, are inputs to the NOx model module and can include a number of factors, including temperatures, pressures, engine control settings including valve and spark timings, and other readings indicative of combustion state within the combustion chamber. Model module 520 receives these inputs and applies known relationships to determine a number of parameters to describe combustion within the combustion chamber. Examples of these descriptive parameters include EGR %, the percentage of exhaust gas diverted back into the combustion chamber in order to control the control the combustion process; an air-fuel charge ratio (AFR) describing the mixture of air and fuel present in the combustion chamber; combustion temperature measurables, including, for example, either combustion burned gas temperature or average combustion temperature; a combustion timing measurable tracking the progress of combustion through a combustion process, for example CA50, a measurement of at what crank angle 50% of the mass of fuel originally present in the combustion chamber is combusted; and fuel rail pressure, indicating the pressure of fuel available to fuel injectors to be sprayed into the combustion chamber. These descriptive parameters can be used to estimate conditions present within the combustion chamber through the combustion process. As described above, conditions present within the combustion chamber affect the creation of NOx in the combustion process. These descriptive parameters can be fed to NOx estimation module 530, wherein programmed calculations utilize the descriptive parameters as inputs to generate an estimate of NOx creation due to the combustion process. However, as described above, models analyzing variable descriptive of the combustion process can include complex calculations which can take longer to calculate than required for generating real-time results, require large amounts of processing capability, and are only as accurate as the pre-programmed algorithm permits. As a result of these challenges and a need for accurate and timely information, estimation of NOx creation within an ECM as part of an aftertreatment control strategy is not presently preferred.

A variety of engine sensor inputs can be used to quantify parameters descriptive of the combustion process. However, combustion occurring within the engine is difficult to directly monitor. Sensors may detect and measure fuel flow and air flow into the cylinder, a sensor may monitor a particular voltage being applied to a spark plug or a processor may gather a sum of information that would predict conditions necessary to generate an auto-ignition, but these readings together are merely predictive of combustion and do not measure actual combustion results. One exemplary method measuring actual combustion results utilizes pressure measurements taken from within the combustion chamber through a combustion process. Cylinder pressure readings provide tangible readings describing conditions within the combustion chamber. Based upon an understanding of the combustion process, cylinder pressures may be analyzed to estimate the state of the combustion process within a particular cylinder, describing the combustion in terms of both combustion phasing and combustion strength. Combustion of a known charge at known timing under known conditions produces a predictable pressure within the cylinder. By describing the phase and the strength of the combustion at certain crank angles, the initiation and the progression of a particular combustion process may be described as an estimated state of combustion. By estimating the state of the combustion process for a cylinder, factors affecting NOx creation through the combustion process can be determined and made available for use in NOx creation estimation.

Figure 13:
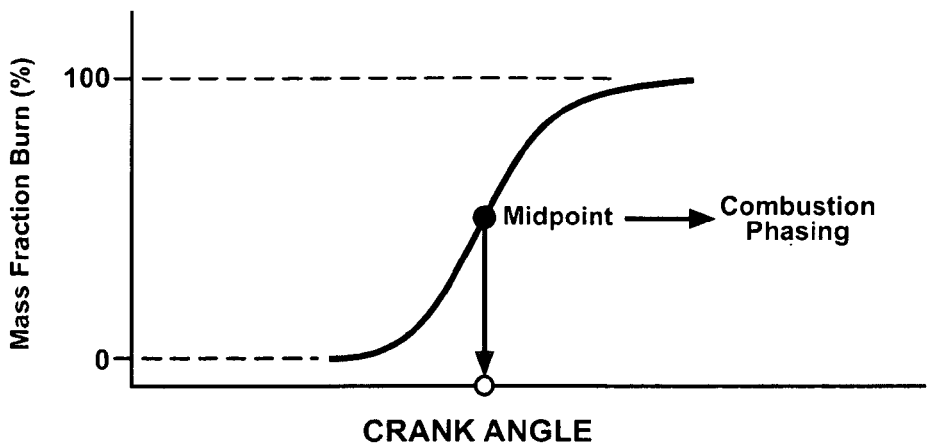
FIG. 13 graphically illustrates an exemplary mass fraction burn curve, in accordance with the present disclosure.

One known method for monitoring combustion phasing is to estimate the mass fraction burn ratio for a given crank angle based upon known parameters. The mass fraction burn ratio describes what percentage of the charge in the combustion chamber has been combusted and serves as a good estimate of combustion phasing. FIG. 13 graphically illustrates an exemplary mass fraction burn curve in accordance with the present disclosure. For a given crank angle, the curve depicted describes the estimated percentage of fuel air mixture within the charge that has been combusted for that combustion process. In order to be used as a metric of combustion phasing, it is known to identify either a particular mass fraction burn percentage of interest or a particular crank angle of interest. FIG. 13 identifies CA50% as a crank angle at which the mass fraction burn equals 50%. By examining this particular metric across a plurality of combustion processes in this cylinder or across a number of cylinders, the comparative phasing of the particular combustion processes may be described.

As described above, combustion phasing can be utilized to estimate the state of a particular combustion process. An exemplary method for monitoring combustion phasing to diagnose ineffective combustion is disclosed whereby combustion in an engine is monitored, mass fraction burn ratios are generated for each cylinder combustion process, and the combustion phasing across the cylinders are compared. If the combustion phase for one cylinder at a particular crank angle for that first cylinder differs by more than a threshold phase difference from the combustion phase for another cylinder at the same crank angle for that second cylinder, anomalous combustion can be inferred. Many sources of anomalous combustion may be diagnosed by this method. For example, if some condition causes early ignition or knocking within the combustion chamber, the cylinder pressure readings will exhibit different values than normal combustion. Additionally, fuel system injection timing faults, causing injection of the charge at incorrect timing, will cause anomalous cylinder pressure readings. Further, if a cylinder misfires or never achieves combustion, the cylinder pressure readings will exhibit different values than normal combustion. Similarly, pressure curves may be used to diagnose other abnormal combustion conditions, such as changes in the air fuel mixture, changes in camshaft phasing, and maintenance failures to related components. Any such diagnoses of combustion health have implications to NOx and can be useful to estimate NOx creation.

Many methods are known to estimate mass fraction burn. One method examines pressure data from within the combustion chamber, including analyzing the pressure rise within the chamber attributable to combustion. Various methods exist to quantify pressure rise in a cylinder attributable to combustion. Pressure ratio management (PRM) is a method based upon the Rassweiler approach, which states that mass fraction burn may be approximated by the fractional pressure rise due to combustion. Combustion of a known charge at a known time under known conditions tends to produce a consistently predictable pressure rise within the cylinder. PRM derives a pressure ratio (PR) from the ratio of a measured cylinder pressure under combustion at a given crank angle ($P_{CYL}(\theta)$) to a calculated motored pressure, estimating a pressure value if no combustion took place in the cylinder, at a given crank angle ($P_{MOT}(\theta)$), resulting in the following equation.

$$PR(\theta) = \frac{P_{CYL}(\theta)}{P_{MOT}(\theta)} \qquad [14]$$

Figure 14:
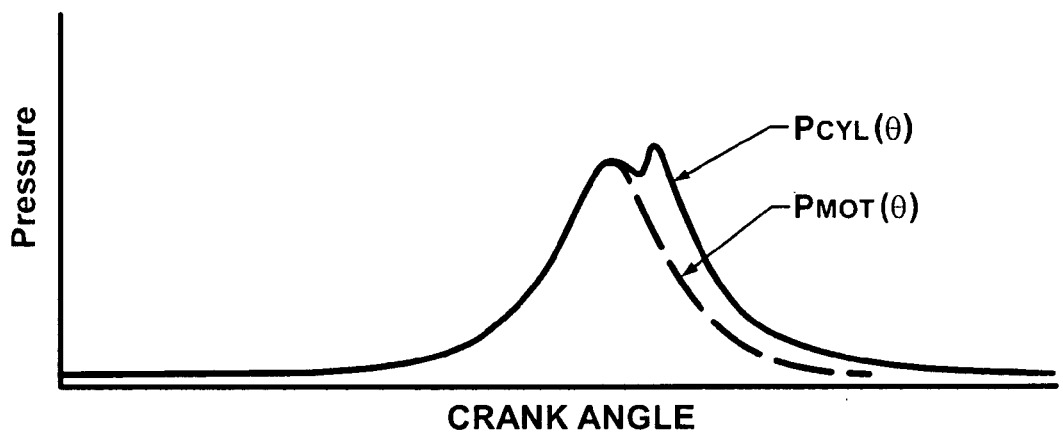
FIG. 14 graphically illustrates an exemplary cylinder pressure plotted against crank angle through a combustion process, in accordance with the present disclosure.

FIG. 14 graphically illustrates an exemplary cylinder pressure plotted against crank angle through a combustion process, in accordance with the present disclosure. $P_{MOT}(\theta)$ exhibits a smooth, inverse parabolic peak from the piston compressing a trapped pocket of gas without any combustion. All valves are closed with the piston at BDC, the piston rises compressing the gas, the piston reaches TDC at the peak of the pressure curve, and the pressure reduces as the piston falls away from TDC. A rise in pressure above $P_{MOT}(\theta)$ is depicted by $P_{CYL}(\theta)$. The timing of combustion will vary from application to application. In this particular exemplary curve, $P_{CYL}(\theta)$ begins to rise from $P_{MOT}(\theta)$ around TDC, describing an ignition event sometime before TDC. As the charge combusts, heat and work result from the combustion, resulting in an increase in pressure within the combustion chamber. PR is a ratio of $P_{MOT}$ to $P_{CYL}$, and $P_{MOT}$ is a component of $P_{CYL}$. Net combustion pressure (NCP($\theta$)) is the difference between $P_{CYL}(\theta)$ and $P_{MOT}(\theta)$ or the pressure rise in the combustion chamber attributable to combustion at a given crank angle. It will be appreciated that by subtracting one from PR, a ratio of NCP to $P_{MOT}$ may be determined as follows.

$$P(\theta) - 1 = \frac{P_{CYL}(\theta)}{P_{MOT}(\theta)} - \frac{P_{MOT}(\theta)}{P_{MOT}(\theta)} = \frac{NCP(\theta)}{P_{MOT}(\theta)} \qquad [15]$$

PR measured through the equation above therefore may be used to directly describe the strength of combustion within a cylinder. Normalizing PR minus one at crank angle $\theta$ to an expected or theoretical maximum PR value minus one yields a fractional pressure ratio of the pressure rise due to combustion at crank angle $\theta$ to the expected total pressure rise due to combustion at the completion of the combustion process. This normalization can be expressed by the following equation.

$$FPR(\theta) = \frac{PR(\theta) - 1}{PR(90°) - 1} \propto MassFractionBurn(\theta) \qquad [16]$$

This fractional pressure ratio, by equating pressure rise attributable to combustion to the progression of combustion, describes the mass fraction burn for that particular combustion process. By utilizing PRM, pressure readings from a cylinder may be used to estimate mass fraction burn for that cylinder.

The above method utilizing PRM is applicable for broad ranges of temperature, cylinder charge and timings associated with compression ignition engines, with the added benefit of not requiring calibrated pressure sensors. Because PR is a ratio of pressures, a non-calibrated linear pressure transducer may be utilized to acquire pressure data readings from each cylinder.

Another method to estimate mass fraction burn is to directly utilize the Rassweiler approach to determine mass fraction burn by calculating the total heat released for a given crank angle. The Rassweiler approach utilizes pressure readings from a cylinder to approximate the incremental heat release in the cylinder. This approach is given by the following equation.

$$Q_{Released}(\theta) = \sum P_{k+1} - P_{k-1}\left(\frac{V_{k-1}}{V_k}\right)^r \quad [17]$$

Mass fraction burn, a measure of how much of the charge has been combusted by a certain crank angle, may be approximated by determining what fraction of heat release for a combustion process has taken place at a given crank angle. The incremental heat release determined by the Rassweiler approach may be summed over a range of crank angles, compared to the total expected or theoretical heat release for the combustion process, and utilized to estimate mass fraction burn. For example, if 75% of the total expected heat release has been realized for a given crank angle, we can estimate that 75% of the combustion for the cycle has taken place at that crank angle.

Other methods may be used to estimate mass fraction burn. One method quantifies the rate of change of energy within the combustion chamber due to combustion through an analysis of classical heat release measures based on analysis of the heat released and work performed through the combustion of the charge. Such analyses are focused on the First Law of Thermodynamics, which states that the net change on energy in a close system is equal to the sum of the heat and work added to the system. Applied to a combustion chamber, the energy increase in the combustion chamber and the enclosed gases equals the heat transferred to the walls of the chamber and the gases plus the expansive work performed by the combustion.

An exemplary method utilizing these classic heat release measures to approximate a mass fraction burn estimate analyzes the rate of heat release by charge combustion throughout combustion process. This rate of heat release, $dQ_{ch}/d\theta$, may be integrated over a range of crank angles in order to describe the net energy released in the form of heat. Through derivations well known in the art, this heat release may be expressed through the following equation.

$$Q = \int \frac{dQ_{ch}}{d\theta} = \int\left(\frac{\gamma}{\gamma-1}p\frac{dV}{d\theta} + \frac{1}{\gamma-1}V\frac{dp}{d\theta}\right) \quad [18]$$

Gamma, $\gamma$, comprises a ratio of specific heats and is nominally chosen as that for air at the temperature corresponding to those used for computing the signal bias and without EGR. Thus, nominally or initially $\gamma=1.365$ for diesel engines and nominally $\gamma=1.30$ for conventional gasoline engines. These can however be adjusted based on the data from the specific heats for air and stoichiometric products using an estimate of the equivalence ratio, $\phi$, and EGR molar fraction targeted for the operating condition and using the relation that $[\gamma=1+(R/c_v)]$, wherein R is the universal gas constant, and the weighted average of air and product properties through the following expression.

$$c_v(T)=(1.0-\phi*EGR)*c_{vair}(T)+(\phi*EGR)*c_{vstoichprod}(T) \quad [19]$$

The expression is evaluated at the gas temperature corresponding to that for pressures sampled for the computation of signal bias.

Whether calculated through the preceding method or by some other method known in the art, the calculation of energy released within the combustion process for a given crank angle may be compared to an expected or theoretical total energy release for the combustion process. This comparison yields an estimate of mass fraction burn for use in describing combustion phasing.

The methods described hereinabove are readily reduced to be programmed into a microcontroller or other device for execution during ongoing operation of an internal combustion engine, as follows.

Once a mass fraction burn curve is generated for a particular combustion process, the curve is useful to evaluate the combustion phasing for that particular combustion process. Referring again to FIG. 14, a reference point is taken from which to compare mass fraction burn estimates from different combustion processes. In this particular embodiment, CA50%, representing the crank angle at which 50% of the charge is combusted, is selected. Other measures can be selected so long as the same measure is used for every comparison.

Determination of mass fraction burn values is a practice well known in the art. Although exemplary methods are described above for determining mass fraction burn, the methods disclosed herein to utilize mass fraction burn values to diagnose cylinder combustion issues may be used with any method to determine mass fraction burn. Any practice for developing mass fraction burn may be utilized, and this disclosure is not intended to be limited to the specific methods described herein.

Additional methods exist to analyze cylinder pressure signals. Methods are known for processing complex or noisy signals and reducing them to useful information. One such method includes spectrum analysis through Fast Fourier Transforms (FFT). FFTs reduce a periodic or repeating signal into a sum of harmonic signals useful to transform the signal into the components of its frequency spectrum. Once the components of the signal have been identified, they may be analyzed and information may be taken from the signal.

Pressure readings from the pressure transducers located in or in communication with the combustion cylinders contain information directly related to the combustion occurring within the combustion chamber. However, engines are very complex mechanisms, and these pressure readings can contain, in addition to a measure of $P_{CYL}(\theta)$, a multitude of pressure oscillations from other sources. Fast Fourier Transforms (FFTs) are mathematical methods well known in the art. One FFT method known as spectrum analysis analyzes a complex signal and separates the signal into its component parts which may be represented as a sum of harmonics. Spectrum analysis of a pressure transducer signal represented by $f(\theta)$ may be represented as follows.

$$FFT(f(\theta))=A_0+(A_1\sin(\omega_0\theta+\phi_1))+(A_2\sin(2\omega_0\theta+\phi_2))+\ldots+(A_N\sin(N\omega_0\theta+\phi_N)) \quad [20]$$

Each component N of the signal $f(\theta)$ represents a periodic input on the pressure within the combustion chamber, each increasing increment of N including signals or higher frequency. Experimental analysis has shown that the pressure oscillation caused by combustion and the piston moving through the various stages of the combustion process, $P_{CYL}(\theta)$, tends to be the first, lowest frequency harmonic. By isolating this first harmonic signal, $P_{CYL}(\theta)$ can be measured and evaluated. As is well known in the art, FFTs provide information regarding the magnitude and phase of each identified harmonic, captured as the $\phi$ term in each harmonic of the above equation. The angle of first harmonic, or $\phi_1$, is, therefore, the dominant term tracking combustion phasing information. By analyzing the component of the FFT output related to $P_{CYL}$, the phasing information of this component can be quantified and compared to either expected phasing or the phasing of other cylinders. This comparison allows for the measured phasing values to be evaluated and a warning indicated if the difference is greater than a threshold phasing difference, indicating combustion issues in that cylinder.

Signals analyzed through FFTs are most efficiently estimated when the input signal is at steady state. Transient effects of a changing input signal can create errors in the estimations performed. While methods are known to compensate for the effects of transient input signals, the methods disclosed herein are best performed at either idle or steady, average engine speed conditions in which the effects of transients are eliminated. One known method to accomplish the test in an acceptably steady test period is to take samples and utilize an algorithm within the control module to either validate or disqualify the test data as being taken during a steady period of engine operation.

It should be noted that although the test data is preferably taken at idle or steady engine operation, information derived from these analyses can be utilized by complex programmed calculations or engine models to effect more accurate engine control throughout various ranges of engine operation. For example, if testing and analysis at idle shows that cylinder number four has a partially clogged injector, fuel injection timing could be modified for this cylinder throughout different ranges of operation to compensate for the perceived issue.

Once cylinder pressure signals have been analyzed through FFTs, information from the pressure signal can be used in variety of ways to analyze the combustion process. For example, the analyzed pressure signal can be used to generate a fractional pressure ratio as discussed in methods above and used to describe the mass fraction burn percentage to describe the progress of the combustion process.

Once a measure such as pressure readings are available, other descriptive parameters relating to a combustion process can be calculated. Sub-models describing particular characteristics of a combustion process can be employed utilizing physical characteristics and relationships well known in the art to translate cylinder pressures and other readily available engine sensor terms into variable descriptive of the combustion process. For example, volumetric efficiency, a ratio of air-fuel charge entering the cylinder as compared to the capacity of the cylinder, can be expressed through the following equation.

$$\eta_{VE}=f(RPM,P_{im},\dot{m}_a) \quad [21]$$

RPM, or engine speed, is easily measurable through a crankshaft speed sensor, as describe above. $P_{im}$, or intake manifold pressure, is typically measured as related to engine control, and is a readily available term. $\dot{m}_a$, or the fresh mass air flow portion of the charge flowing into the cylinder, is also a term frequently measured in the air intake system of the engine or can alternatively be easily derived from $P_{im}$, ambient barometric pressure, and known characteristics of the air intake system. Another variable descriptive of the combustion process that can be derived from cylinder pressures and other readily available sensor readings is charge flow into the cylinder, $\dot{m}_c$. $\dot{m}_c$ can be determined by the following equation.

$$\dot{m}_c = \frac{P_{im} \cdot rpm \cdot D \cdot \eta}{2RT_{im}} \quad [22]$$

D equals the displacement of the engine. R is a gas constant well known in the art. $T_{im}$ is a temperature reading from the inlet manifold. Another variable descriptive of the combustion process that can be derived from cylinder pressures and other readily available sensor readings is EGR %, or the percentage of exhaust gas being diverted into the exhaust gas recirculation circuit. EGR % can be determined by the following equation.

$$EGR\% = 1 - \frac{\dot{m}_a}{\dot{m}_c} \quad [23]$$

Yet another variable descriptive of the combustion process that can be derived from cylinder pressures and other readily available sensor readings is CAx, wherein x equals a desired fractional pressure ratio. CAx can be determined by the following equation.

$$Z = \frac{P_{CYL}(\theta)}{P_{MOT}(\theta)} - 1 \quad [24]$$

Filling in the desired fractional pressure ratio as Z and solving for $\theta$ yields CAx. For instance CA50 can be determined as follows.

$$\frac{P_{CYL}(\theta)}{P_{MOT}(\theta)} = 1.5 \quad [25]$$

Figure 15:
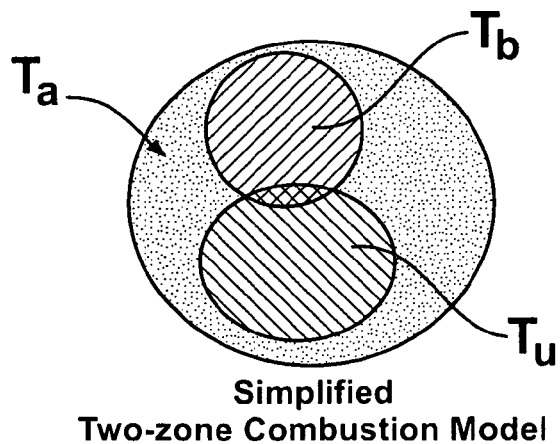
FIG. 15 depicts a number of different temperatures capable of estimation within the combustion chamber relevant to describing the combustion process, in accordance with the present disclosure.

Various temperatures within the combustion chamber can also be estimated from cylinder pressures and other readily available sensor readings. FIG. 15 depicts a number of different temperatures capable of estimation within the combustion chamber useful to describing the combustion process, in accordance with the present disclosure. $T_a$, the average temperature within the combustion chamber can be determined by the following equation.

$$T_a = \frac{P_{max} \cdot V(PPL)}{1.05 * \dot{m}_c R} \quad [26]$$

$P_{max}$ is the maximum pressure achieved within the combustion chamber through the combustion process. PPL is a measure of the crank angle at which $P_{max}$ occurs. V(PPL) is the volume of the cylinder at the point $P_{max}$ occurs. $T_u$, the average temperature of the not yet combusted or unburned portion of the charge within the combustion chamber, can be determined by the following equation.

$$T_u = \frac{1.05 * \dot{m}_c}{1.05 * \dot{m}_c - \alpha \cdot \dot{m}_f \lambda_S} [0.05\beta T_{ex} + 0.95 T_{im}] \left(\frac{P_{max} - \Delta P}{P_{im}}\right)^{\frac{r-1}{r}} \quad [27]$$

$\dot{m}_f$ is the fuel mass flow, and can be determined either from a known fuel rail pressure in combination with known properties and operation of the fuel injectors or from $\dot{m}_c$ and $\dot{m}_a$. $\alpha$ and β are calibrations based on engine speed and load and may be developed experimentally, empirically, predictively, through modeling or other techniques adequate to accurately predict engine operation, and a multitude of calibration curves might be used by the same engine for each cylinder and for different engine settings, conditions, or operating ranges. $\lambda_s$ is the stoichiometric air-fuel ratio for the particular fuel and includes values well known in the art. $T_{ex}$ is a measured exhaust gas temperature. $T_{im}$ and $P_{im}$ are temperature and pressure readings taken at the intake manifold. $P_{max}$-$\Delta P$ describes the pressure in the combustion chamber just before the start of combustion. γ is a specific heat constant described above. $T_b$, the average temperature of the combusted or burned portion of the charge within the combustion chamber, can be determined by the following equation.

$$T_b = \frac{T_a - (1 - x_b)T_u}{x_b}, x_b = \frac{\alpha \cdot \dot{m}_f(1 + \lambda_S)}{1.05\dot{m}_c} \quad [28]$$

Note that the above equations are simplified in a method well known in the art by neglecting heat loss to cylinder wall. Methods to compensate for this simplification are well known in the art and will not be described in detail herein. Through the use of the aforementioned relationships and derivations, cylinder pressure and other readily available sensor readings can be used to determine a number of parameters descriptive of the combustion process being monitored.

Figure 16:
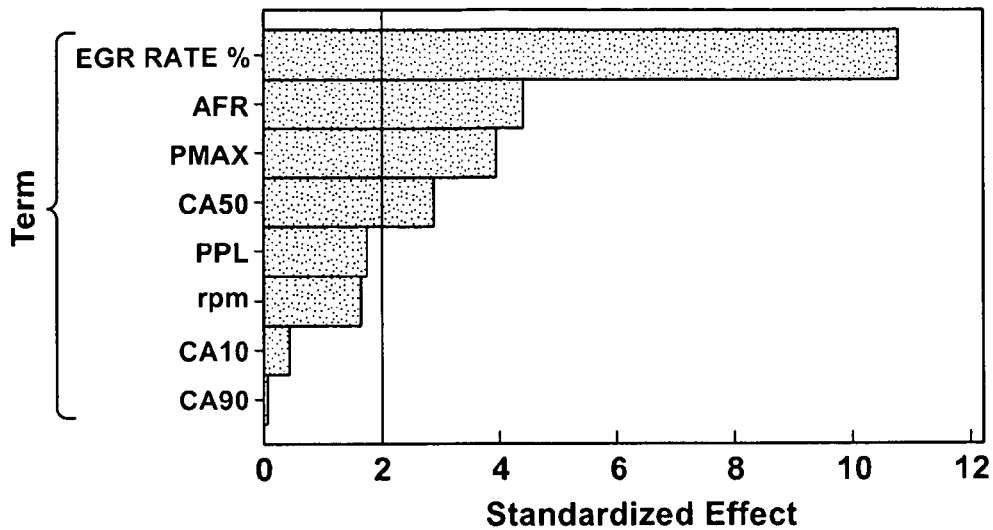
FIG. 16 is a graphical depiction of exemplary modeled results describing standardized effects of a number of inputs to NOx emissions under a given set of conditions, in accordance with the present disclosure.

As described above, cylinder pressure readings can be used to describe a state of combustion occurring within the combustion chamber for use as a factor in estimating NOx creation. Also as described above, a number of other factors are relevant to accurately estimating NOx creation. FIG. 16 is a graphical depiction of exemplary modeled results describing standardized effects of a number of inputs to NOx emissions under a given set of conditions, in accordance with the present disclosure. As described above, methods are known utilizing a model module and a NOx estimation module to simulate or estimate NOx creation based upon known characteristics of an engine. The model utilized to characterize NOx creation by a combustion process in this particular exemplary analysis can be characterized by the following expression.

$$Nox = NNT(Pmax, CA50, CApmax, EGR\%, AFR) \quad [29]$$

As shown in the graphical results of FIG. 16, a number of factors have varying effects on NOx creation. Under this particular set of conditions, EGR % has the largest impact upon NOx creation for the engine modeled. In this instance, by methods well known in the art, recirculating a particular amount of exhaust gas back into the combustion chamber through the EGR circuit lowers the adiabatic flame temperature of the combustion process, thereby lowering the temperatures that nitrogen and oxygen molecules are exposed to during combustion and, thereby, lowering the rate of NOx creation. By studying such models under various engine operating conditions, the neural network can be provided with the most useful inputs to provide accurate estimates of NOx creation. Additionally, studying such models provides information useful to selecting input data to initially train the neural network, varying inputs and providing corresponding outputs to sensor inputs and descriptive parameters most likely to impact NOx creation.

Figure 17:
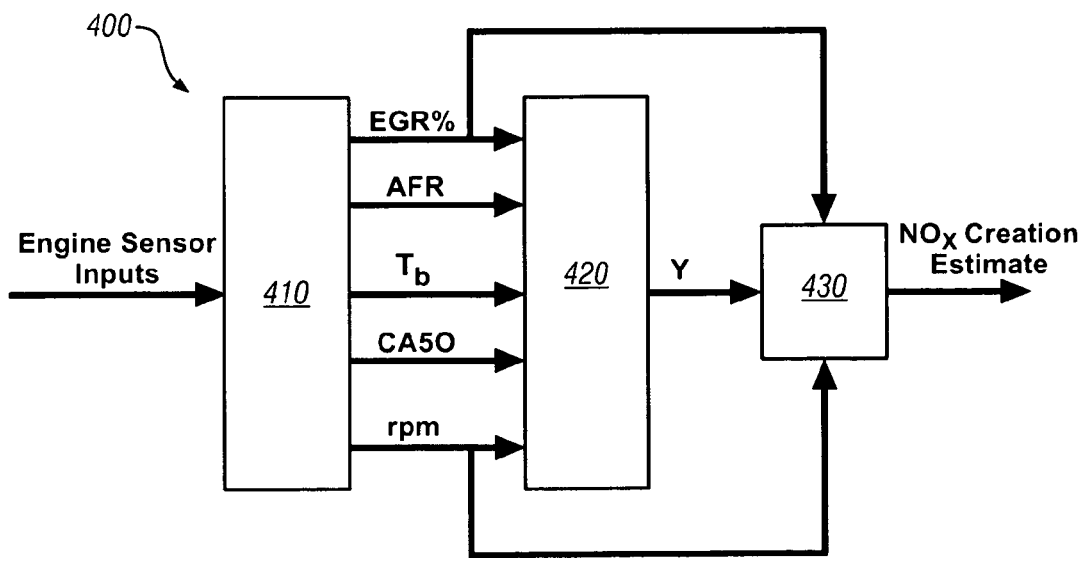
FIG. 17 schematically depicts an exemplary system generating a NOx creation estimate, utilizing models within a neural network to generate NOx creation estimates and including a dynamic model module to compensated NOx creation estimates for the effects of dynamic engine and vehicle conditions, in accordance with the present disclosure.

By methods described above, NOx creation estimates can be generated for a set of engine sensor inputs. As will be appreciated by one having ordinary skill in the art, equations and model predictions of engine operation frequently operate most effectively when the engine is operating at or near steady state However, observations and predictions can be made regarding the effects of transient or dynamic engine operation upon NOx creation estimates or the accuracy thereof. An exemplary expression describing a dynamic model or dynamic filtering module is shown by the following:

$$\frac{dNOx}{dt} = f(NOx, y, EGR\%, AFR, Ta, RPM) \quad [30]$$

wherein contemporary NOx readings and an output y from a trained neural network are utilized to estimate a change in NOx creation. Such a change variable can be used to incrementally estimate NOx creation or can be used to check or filter NOx creation estimations. FIG. 17 schematically depicts an exemplary system generating a NOx creation estimate, utilizing models within a neural network to generate NOx creation estimates and including a dynamic model module to compensated NOx creation estimates for the effects of dynamic engine and vehicle conditions, in accordance with the present disclosure. NOx creation estimate system 400 comprises a model module 410, a neural network module 420, and a dynamic model module 430. Factors under current operating conditions most likely to impact NOx creation estimation under dynamic or changing conditions can be determined experimentally, empirically, predictively, through modeling or other techniques adequate to accurately predict engine operation. Inputs relating to these factors are fed to dynamic model module 430 along with output from neural network module 420, and the raw output from the neural network can be adjusted, filtered, averaged, de-prioritized or otherwise modified based upon the projected effects of the dynamic conditions determined by dynamic model module 430. In this way, the effects of dynamic engine or vehicle operation conditions can be accounted for in the estimation of NOx creation.

Measurements of actual conversion efficiency can be noisy. Integration can be used as a low pass filter in the comparison of an actual conversion efficiency to a malfunction conversion efficiency. Interpretation of the various signals, especially a comparison of the various predicted NOx values at any given time, is prone to noise induced misinterpretation or false identifications. Comparison of the data curves generated through integration is greatly simplified, and the potential for misinterpretation or false identifications in a comparison are greatly reduced.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed:

1. Method for controlling a malfunction catalyst diagnostic test within a powertrain comprising an internal combustion engine and an aftertreatment system including a selective catalytic reduction device, wherein said test determines a malfunction status of a catalyst within said selective catalytic reduction device, said method comprising:
   monitoring an exhaust gas flow within said aftertreatment system;

estimating an effect of said exhaust gas flow on an estimated reductant storage on a catalyst within said selective catalytic reduction device; and selectively disabling said malfunction catalyst diagnostic test based upon said estimating said effect of said exhaust gas flow on said estimated reductant storage.

2. The method of claim 1, wherein said estimated reductant storage comprises an estimated ammonia storage.

3. The method of claim 1, wherein said monitoring said exhaust gas flow comprises:
monitoring a temperature within said selective catalytic reduction device;
monitoring a space velocity of said exhaust gas flow within said selective catalytic reduction device; and
monitoring a reductant in said exhaust gas flow.

4. The method of claim 3, wherein said monitoring said reductant in said exhaust gas flow comprises:
monitoring injection of urea into said exhaust gas flow.

5. The method of claim 3, wherein said monitoring said reductant in said exhaust gas flow comprises:
monitoring ammonia produced by catalyzing components of said exhaust gas flow.

6. The method of claim 1, further comprising determining a reductant storage required to efficiently operate said selective catalytic reduction device;
wherein said estimating said effect of said exhaust gas flow on said estimated reductant storage comprises determining said estimated reductant storage; and
wherein said selectively disabling said malfunction catalyst diagnostic test based upon said estimating said effect comprises disabling said malfunction catalyst diagnostic test if said estimated reductant storage is less than said reductant storage required to efficiently operate said selective catalytic reduction device.

7. The method of claim 1, wherein said estimating said effect of said exhaust gas flow on said estimated reductant storage comprises determining said estimated reductant storage;
said method further comprising evaluating an accuracy of said estimated reductant storage; and
wherein said selectively disabling said malfunction catalyst diagnostic test based upon said estimating said effect comprises disabling said malfunction catalyst diagnostic test if said accuracy of said estimated reductant storage degrades by more than a threshold accuracy measure.

8. The method of claim 1, wherein said monitoring said exhaust gas flow comprises:
monitoring a catalyst bed temperature within said selective catalytic reduction device; and
wherein said selectively disabling said malfunction catalyst diagnostic test is based upon said catalyst bed temperature.

9. The method of claim 8, wherein said disabling said malfunction catalyst diagnostic test comprises disabling said malfunction catalyst diagnostic test if said catalyst bed temperature exceeds a high temperature threshold.

10. The method of claim 8, wherein said disabling said malfunction catalyst diagnostic test comprises disabling said malfunction catalyst diagnostic test if said catalyst bed temperature is less than a low temperature threshold.

11. The method of claim 1, wherein said monitoring said exhaust gas flow comprises:
monitoring a catalyst bed temperature within said selective catalytic reduction device;
determining an average catalyst bed temperature through a time period; and
wherein said selectively disabling said malfunction catalyst diagnostic test is based upon said average catalyst bed temperature and a normal catalyst bed temperature operating range.

12. The method of claim 1, wherein said monitoring said exhaust gas flow comprises:
monitoring a rate of temperature change within said selective catalytic reduction device; and
wherein said selectively disabling said malfunction catalyst diagnostic test is based upon said rate of temperature change.

13. The method of claim 1, wherein said monitoring said exhaust gas flow comprises:
monitoring a temperature within said selective catalytic reduction device;
monitoring a rate of temperature change within said selective catalytic reduction device; and
wherein said selectively disabling said malfunction catalyst diagnostic test is based upon said temperature and said rate of temperature change.

14. The method of claim 1, wherein said monitoring said exhaust gas flow comprises:
monitoring an engine speed rate of change; and
wherein said selectively disabling said malfunction catalyst diagnostic test is based upon said engine speed rate of change.

15. The method of claim 14, wherein said monitoring said engine speed rate of change comprises monitoring an engine fueling rate; and
wherein said selectively disabling said malfunction catalyst diagnostic test is based upon said engine fueling rate falling below a threshold engine fueling rate.

16. The method of claim 1, wherein said monitoring said exhaust gas flow comprises:
monitoring initiation of an aftertreatment regeneration cycle; and
wherein said selectively disabling said malfunction catalyst diagnostic test is based upon said initiation of said aftertreatment regeneration cycle.

17. The method of claim 1, wherein said monitoring said exhaust gas flow comprises:
monitoring a NO to $NO_2$ ratio; and
wherein said selectively disabling said malfunction catalyst diagnostic test is based upon said ratio.

18. The method of claim 1, further comprising determining a desired reductant storage value based upon said monitoring said exhaust gas flow;
wherein said estimating said effect of said exhaust gas flow on said estimated reductant storage comprises determining said estimated reductant storage;
said method further comprising determining a control error based upon said desired reductant storage value and said estimated reductant storage; and
wherein said selectively disabling said malfunction catalyst diagnostic test is based upon said control error.

19. The method of claim 1, wherein said monitoring said exhaust gas flow comprises:
monitoring an engine out NOx value;
said method further comprising diagnosing an engine out NOx fault based upon said engine out NOx value; and
wherein said selectively disabling said malfunction catalyst diagnostic test is based upon said engine out NOx fault.

20. The method of claim 1, wherein said monitoring said exhaust gas flow comprises:
monitoring a temperature within said selective catalytic reduction device;
wherein said estimating said effect of said exhaust gas flow on said estimated reductant storage comprises determining said estimated reductant storage; and wherein said selectively disabling said malfunction catalyst diagnostic test is based upon said temperature and said estimated reductant storage.

21. The method of claim 1, wherein said monitoring said exhaust gas flow comprises:
    monitoring a temperature within said selective catalytic reduction device; and
    monitoring a space velocity within said selective catalytic reduction device; and
    wherein said selectively disabling said malfunction catalyst diagnostic test is based upon said temperature and said space velocity.

22. The method of claim 21, wherein said selectively disabling said malfunction catalyst diagnostic test based upon said temperature and said space velocity comprises:
    classifying operation of said selective catalytic reduction device as operating within one of a stable region and a transitory region based upon said temperature and said space velocity;
    if said classifying indicates said stable region, then selectively disabling said malfunction catalyst diagnostic test based upon a stable disabling criteria; and
    if said classifying indicates said transitory region, then selectively disabling said malfunction catalyst diagnostic test based upon a transitory disabling criteria.

23. Method for controlling a malfunction catalyst diagnostic test within a powertrain comprising an internal combustion engine and an aftertreatment system including a selective catalytic reduction device, wherein said test determines a malfunction status of a catalyst within said selective catalytic reduction device, said method comprising:
    monitoring an estimated reductant storage on a catalyst within said selective catalytic reduction device;
    comparing said estimated reductant storage to an reductant storage required to efficiently operate said selective catalytic reduction device; and
    selectively disabling said malfunction catalyst diagnostic test if said estimated reductant storage is less than said reductant storage required to efficiently operate said selective catalytic reduction device.

24. The method of claim 23, wherein said estimated reduction storage comprises an estimated ammonia storage; and
    wherein said reductant storage required to efficiently operate said selective catalytic reduction device comprises an ammonia storage required to efficiently operate said selective catalytic reduction device.

25. The method of claim 23, wherein said monitoring said estimated reductant storage on said catalyst comprises:
    monitoring a temperature within said selective catalytic reduction device;
    monitoring a space velocity of an exhaust gas flow within said selective catalytic reduction device; and
    determining said estimated reductant storage based upon said temperature and said space velocity.

26. The method of claim 23, wherein said monitoring said estimated reductant storage on said catalyst comprises:
    monitoring introduction of a reductant to said selective catalytic reduction device; and
    wherein said determining said estimated reductant storage is further based upon said monitoring said introduction.

27. The method of claim 23, wherein said monitoring said estimated reductant storage on said catalyst comprises:
    monitoring a temperature within said selective catalytic reduction device; and
    estimating an effect of said temperature upon said estimated reductant storage.

28. The method of claim 23, wherein said monitoring said estimated reductant storage on said catalyst comprises:
    monitoring a temperature within said selective catalytic reduction device;
    monitoring a space velocity within said selective catalytic reduction device; and
    estimating an effect of said temperature and said space velocity upon said estimated reductant storage.

29. The method of claim 23, further comprising selectively enabling said malfunction catalyst diagnostic test after a time period calibrated to restore said estimated reductant storage above said reductant storage required to efficiently operate said selective catalytic reduction device.

30. Apparatus for controlling a malfunction catalyst diagnostic test within a powertrain comprising an internal combustion engine and an aftertreatment system including a selective catalytic reduction device, wherein said test determines a malfunction status of a catalyst within said selective catalytic reduction device, said apparatus comprising:
    said selective catalytic reduction device;
    sensors monitoring an exhaust gas flow within said aftertreatment system; and
    a control module configured to
        monitor said sensors,
        estimate an effect of said exhaust gas flow on an estimated reductant storage on a catalyst within said selective catalytic reduction device, and
        selectively disable said malfunction catalyst diagnostic test based upon said estimate of said effect of said exhaust gas flow on said estimated reductant storage.

31. The apparatus of claim 30, wherein said sensors are configured to monitor an exhaust gas flow temperature upstream of said selective catalytic reduction device, to monitor an engine output allowing estimation of a space velocity within said selective catalytic reduction device, and to monitor introduction of a reductant in said exhaust gas flow.

32. The apparatus of claim 30, wherein said control module configured to estimate said effect of said exhaust gas flow on said estimated reductant storage comprises use of a virtual NOx sensor.

33. The apparatus of claim 30, wherein said control module configured to estimate said effect of said exhaust gas flow on said estimated reductant storage comprises said control module configured to estimate a catalyst bed temperature.

34. The apparatus of claim 30, wherein said control module configured to estimate said effect of said exhaust gas flow on said estimated reductant storage comprises said control module configured to evaluate effects of temperature within said selective catalytic reduction device.

35. The apparatus of claim 30, wherein said control module configured to estimate said effect of said exhaust gas flow on said estimated reductant storage comprises said control module configured to evaluate effects of a rate of temperature change within said selective catalytic reduction device.

36. The apparatus of claim 30, wherein said control module configured to estimate said effect of said exhaust gas flow on said estimated reductant storage comprises said control module configured to evaluate effects of a rate of engine speed change within said selective catalytic reduction device.

37. The apparatus of claim 30, wherein said control module configured to estimate said effect of said exhaust gas flow on said estimated reductant storage comprises said control module configured to evaluate effects of temperature and space velocity within said selective catalytic reduction device.

* * * * *